US012767762B2

(12) United States Patent
Kumagai et al.

(10) Patent No.: US 12,767,762 B2
(45) Date of Patent: Oct. 20, 2026

(54) POLY(ARYLENE SULFIDE) AND PRODUCTION METHOD THEREFOR

(71) Applicant: Toray Industries, Inc., Tokyo (JP)

(72) Inventors: Naoto Kumagai, Tokai (JP); Hideyuki Nakashima, Tokai (JP); Tomoya Yoshida, Nagoya (JP); Takeshi Unohara, Otsu (JP)

(73) Assignee: Toray Industries, Inc., Tokyo (JP)

(*) Notice: Subject to any disclaimer, the term of this patent is extended or adjusted under 35 U.S.C. 154(b) by 803 days.

(21) Appl. No.: 17/913,187

(22) PCT Filed: Mar. 22, 2021

(86) PCT No.: PCT/JP2021/011688
§ 371 (c)(1),
(2) Date: Sep. 21, 2022

(87) PCT Pub. No.: WO2021/200332
PCT Pub. Date: Oct. 7, 2021

(65) Prior Publication Data

US 2023/0133345 A1 May 4, 2023

(30) Foreign Application Priority Data

Mar. 31, 2020 (JP) ................................ 2020-062690
May 28, 2020 (JP) ................................ 2020-093134
Nov. 5, 2020 (JP) ................................ 2020-184948

(51) Int. Cl.
*C08G 75/0213* (2016.01)
*B29C 45/00* (2006.01)
*C08G 75/0259* (2016.01)
*C08G 75/0281* (2016.01)
*C08K 5/5435* (2006.01)
*B29K 81/00* (2006.01)

(52) U.S. Cl.
CPC ...... *C08G 75/0213* (2013.01); *B29C 45/0001* (2013.01); *C08G 75/0259* (2013.01); *C08G 75/0281* (2013.01); *C08K 5/5435* (2013.01); *B29K 2081/04* (2013.01)

(58) Field of Classification Search
CPC ............ C08G 75/0259; C08G 75/0281; C08G 75/0213; C08K 5/5435
See application file for complete search history.

(56) References Cited

U.S. PATENT DOCUMENTS

| | | | |
|---|---|---|---|
| 3,524,835 | A | 8/1970 | Edmonds, Jr. et al. |
| 4,769,442 | A | 9/1988 | Iwasaki et al. |
| 5,071,949 | A | 12/1991 | Nakamura et al. |

FOREIGN PATENT DOCUMENTS

| | | | |
|---|---|---|---|
| EP | 0087038 | A1 | 8/1983 |
| EP | 1927615 | A1 | 6/2008 |
| GB | 1056226 | A | 1/1967 |
| GB | 2093468 | A | 9/1982 |
| JP | S61-255933 | A | 11/1986 |
| JP | S62-232437 | A | 10/1987 |
| JP | H07-233256 | A | 9/1995 |
| JP | 2004-099684 | A | 4/2004 |
| JP | 2010-053335 | A | 3/2010 |
| JP | 2014-141570 | A | 8/2014 |
| WO | 2020026918 | A1 | 2/2020 |

OTHER PUBLICATIONS

Mizuno et al (JP 2775635), English translation, published on Jul. 16, 1998.*
Hide et al (JP 2018024851), English translation published on Feb. 15, 2018.*
Tsuchiya et al (JP 5423038), English translation, published on Feb. 19, 2014.*
Takao et al (JP 2018188610), English translation, published on Nov. 29, 2018.*
Office Action dated Sep. 3, 2023, from counterpart Chinese Patent Application No. 202180022344.0.
Extended European Search Report dated Apr. 16, 2024, from counterpart European Application No. 21780930.0.
International Search Report dated May 25, 2021 in counterpart International Application No. PCT/JP2021/011688.
Written Opinion dated May 25, 2021 in counterpart International Application No. PCT/JP2021/011688.

* cited by examiner

*Primary Examiner* — Gregory Listvoyb
(74) *Attorney, Agent, or Firm* — DLA Piper LLP (US)

(57) ABSTRACT

A polyarylene sulfide in which when the cumulative integral value from the molecular weight of 100 to the molecular weight of 10,000 in a molecular weight distribution curve is 100, the cumulative integrated value at the molecular weight of 4000 is 48 to 53, and when the melt flow rate of the polyarylene sulfide is defined as MFR1, and when the melt flow rate obtained after mixing the polyarylene sulfide with an epoxy silane coupling agent at a weight ratio of 100:1 and heating the resulting mixture at 315.5° C. for 5 minutes is defined as MFR2, the rate of change represented by MFR2/MFR1 is not more than 0.085.

7 Claims, No Drawings

POLY(ARYLENE SULFIDE) AND PRODUCTION METHOD THEREFOR

TECHNICAL FIELD

This disclosure relates to a polyarylene sulfide that causes less mold deposits during molding, having excellent melt fluidity, and having high reactivity with a coupling agent; and a production method therefor.

BACKGROUND

Polyarylene sulfides (PAS's), represented by polyphenylene sulfide, are engineering plastics having excellent heat resistance, chemical resistance, flame retardance, electrical properties, and mechanical properties. Polyarylene sulfides are widely used for fibers, films, injection molding, and extrusion molding.

Although the polyarylene sulfide resins are resins having excellent properties as described above, they are known to generate a gas derived from oligomer components when they are heated and melted during molding, which is problematic. In particular, the following problems, for example, have been pointed out. Oligomer components having relatively low volatility (high boiling points) tend to be adhered and deposited on the mold after once being gasified by the heat, causing mold deposits. Because of this effect, periodical maintenance of the mold is required. Further, when the resins are used for projectors, automobile lamp reflectors, and the like that are used at high temperature, such oligomer components cause fogging of lens parts that are present around them. Accordingly, to solve the problems, development of techniques has long been carried out for removing oligomer components in polyarylene sulfide resins to reduce gas generation during the heating.

Examples of a known method of low gasification of a PAS include a method in which a dihalogenated aromatic compound is reacted with an alkali metal sulfide in an organic polar solvent, and the resulting reaction mixture is subjected to solid-liquid separation, followed by subjecting the collected solid content to solvent washing to obtain a PAS (see, for example, JP S62-232437 A (Claims)). By that method, oligomer components soluble in the solvent can be efficiently removed to obtain a PAS whose gas generation is reduced.

In another known method (the quench method), a dihalogenated aromatic compound is reacted with an alkali metal sulfide in an organic polar solvent, and then water is added in the system before PAS particles precipitate, followed by slowly cooling the system to allow growth of PAS particles to a large particle size, carrying out separation by sieving through a mesh with an opening of about 100 to 200 μm, washing the obtained PAS in an organic solvent and water in this order, and then drying, to obtain a PAS (see, for example, JP S61-255933 A (Claims)). Also by that method, oligomer components soluble in the solvent can be efficiently removed to obtain a PAS whose gas generation is reduced.

In another known method (the curing method), a dihalogenated aromatic compound is reacted with an alkali metal sulfide in an organic polar solvent, and then the reaction system under high temperature conditions is flashed into a container at normal pressure or decompression pressure to recover a PAS, followed by washing the PAS with water and drying (the flash method), to once obtain a PAS. The PAS is then subjected to heat treatment at 220° C. under an inert gas atmosphere, to obtain a PAS whose gas generation is reduced (see, for example, JP H7-233256 A (Claims)).

However, although the method of JP '437 is capable of removing oligomer components having relatively low volatility (high boiling points) to achieve the reduction of the mold deposits, the method is characterized in that it requires a washing process with water after the solvent washing to remove water-soluble substances produced as by-products in the reaction, and that the filtrate generated in the water washing process contains all of water, which has large evaporation latent heat, the water-soluble substances, and the organic polar solvent. Irrespective of whether the filtrate is discarded or the organic polar solvent is recovered, a high cost is required so that the cost of industrial production of a PAS is very high, which is problematic.

The method of JP '933 is capable of achieving the reduction of the mold deposits similarly to the method of JP '437, and capable of reducing the cost of the recovery of the organic polar solvent compared to the method of JP '437 since the water-soluble substances and the oligomer components can be removed without using water in the separation by sieving using a mesh. However, since the cost of the method is still relatively high as the production cost for PAS, further cost reduction has been required. Moreover, since the method of JP '933 is characteristic in that porous PAS particles are obtained, the method tends to cause excessive removal of oligomer components not corresponding to the causative substances of the mold deposits by washing. Due to that effect, the method also has a problem that a PAS having low melt fluidity and poor moldability tends to be obtained, and therefore improvement of the method has been required.

In the method of JP '256, the organic polar solvent can be recovered when the operation of flashing the polymerization reaction product is performed. Thus, the recovery cost for the solvent is low, and therefore the method enables production of a PAS at low cost. However, although the treatment enables removal of oligomer components having high volatility, the treatment for the low gasification is merely heat treatment under an inert gas atmosphere so that the method hardly enables removal of oligomer components having relatively low volatility (high boiling points) that are adhered and deposited on the mold during molding of the PAS. Thus, the obtained PAS shows a high level of mold deposits, and improvement of the method has been required.

It could therefore be helpful to enable production of a PAS that generates less mold deposits during molding, having excellent melt fluidity, and having high reactivity with a coupling agent, at low cost.

SUMMARY

We thus provide:

A method of producing a polyarylene sulfide, the method comprising reacting a mixture containing at least a sulfidating agent, a dihalogenated aromatic compound, and an organic polar solvent under heat, wherein, after the end of the reaction for generating the polyarylene sulfide, Steps 1, 2, 3 and 4 are carried out:

Step 1: a step in which the organic polar solvent is distilled off from the reaction mixture obtained at the end of the reaction, to obtain a solid content containing the polyarylene sulfide;

Step 2: a step which follows Step 1, wherein the solid content containing the polyarylene sulfide is washed with water;

Step 3: a step which follows Step 2, wherein the polyarylene sulfide is washed with an organic solvent such that the amount of chloroform-extractable components in the polyarylene sulfide becomes not more than 1.7% by weight; and Step 4: a step which follows Step 3, wherein the polyarylene sulfide is heated under a flow of an inert gas at a flow rate of not less than 0.2 L/minute per 1 kg of the polyarylene sulfide, to distill off the organic solvent used in Step 3.

The PAS has the following constitution.

A polyarylene sulfide in which when the cumulative integral value from the molecular weight of 100 to the molecular weight of 10,000 in a molecular weight distribution curve is taken as 100, the cumulative integrated value at the molecular weight of 4,000 is 48 to 53, and when the melt flow rate of the polyarylene sulfide is defined as MFR1, and when the melt flow rate obtained after mixing the polyarylene sulfide with an epoxy silane coupling agent at a weight ratio of 100:1 and heating the resulting mixture at 315.5° C. for 5 minutes is defined as MFR2, the rate of change represented by MFR2/MFR1 is not more than 0.085.

In the method of producing a PAS, in Step 1, the distillation temperature for the organic polar solvent is preferably 200° C. to 250° C.

In the method of producing a PAS, in Step 3, the water content in the polyarylene sulfide before the washing with the organic solvent is preferably not more than 30% by weight.

In the method of producing a PAS, in Step 3, the specific surface area of the polyarylene sulfide before the washing with the organic solvent is preferably 5 $m^2/g$ to 50 $m^2/g$.

In the method of producing a PAS, in Step 4, the distillation temperature for the organic solvent is preferably 70° C. to 250° C.

In the method of producing a PAS, in Step 4, the distillation time for the organic solvent is preferably 0.1 hours to 50 hours.

In the PAS, the polyarylene sulfide preferably has a particulate shape, and the polyarylene sulfide particle preferably has a median diameter D50 of 1 μm to 400 μm.

According to the method, a PAS that generates less mold deposits during resin molding, having excellent melt fluidity, and having high reactivity with a coupling agent, can be produced by a mass-produced method at low production cost.

DETAILED DESCRIPTION

Examples of our PAS's and methods are described below.

(1) Polyarylene Sulfide

Our polyarylene sulfide is a homopolymer or copolymer containing a repeating unit of the formula —(Ar—S)— as a main constituent unit. Examples of Ar include units represented by Formula (A) to Formula (L). Formula (A) is especially preferred.

(A)

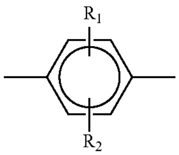

-continued (B)

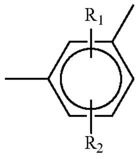

(C)

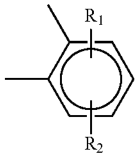

(D)

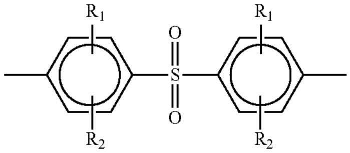

(E)

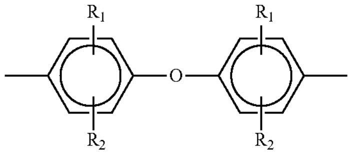

(F)

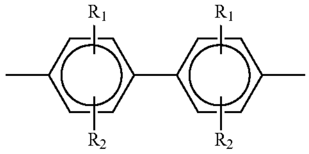

(G)

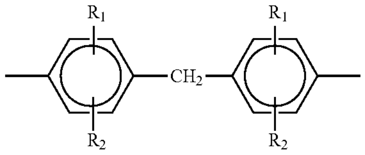

(H)

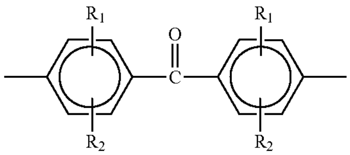

(I)

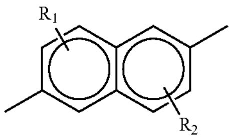

(J)

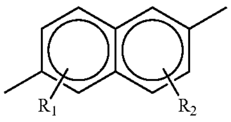

-continued (K)

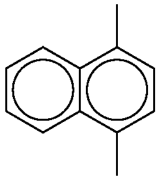

(L)

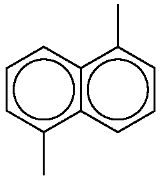

$R_1$ and $R_2$ are substituent groups selected from hydrogen, an alkyl group, an alkoxy group, and a halogen group, and $R_1$ and $R_2$ may be the same or different. As long as this repeating unit is contained as a main constituent unit, the polyarylene sulfide may contain a small amount of branch units or crosslink units represented by, for example, Formula (M) to Formula (P). The copolymerized amount of these branch units or crosslink units is preferably 0 mol % to 1 mol % per 1 mole of —(Ar—S)— units.

(M)

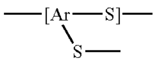

(N)

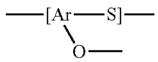

(O)

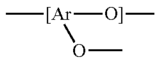

(P)

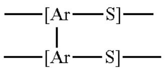

The PAS may also be a random copolymer or block copolymer containing the repeating unit, or a mixture of these. Their representative examples include polyphenylene sulfide, polyphenylene sulfide sulfone, and polyphenylene sulfide ketone; random copolymers and block copolymers thereof; and mixtures thereof. Particularly preferred examples of the PAS include polyphenylene sulfide, polyphenylene sulfide sulfone, and polyphenylene sulfide ketone containing the p-phenylene unit represented by the following formula at not less than 90 mol % as a main constituent unit of the polymer.

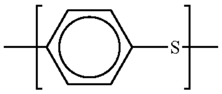

The molecular weights of these PAS's are not limited, and examples of common weight average molecular weights Mw of the PAS's may include 5,000 to 1,000,000, preferably 7,500 to 500,000, more preferably 10,000 to 100,000. Measurement of the molecular weight of a PAS is carried out by gel permeation chromatography (GPC), which is a type of size exclusion chromatography (SEC). The melt viscosity, which is known to be correlated with the weight average molecular weight Mw, may be, for example, 0.1 to 1,000 Pa·s (300° C.; shear rate, 1000/second), preferably 0.1 to 500 Pa·s, based on the preferred Mw described above. A PAS having a molecular weight and a melt viscosity within the preferred ranges described above tends to have excellent moldability, and to be preferably used in a wide range of uses.

(2) Chloroform-Extractable Components

The chloroform-extractable components means mainly oligomer components contained in the PAS, which oligomer components are composed of cyclic PAS and linear PAS oligomers. The ratios of these components are not limited.

The cyclic PAS is a cyclic compound containing a repeating unit of the formula —(Ar—S)— as a main constituent unit, and is preferably a compound containing the repeating unit at not less than 80 mol % such as General Formula (Q).

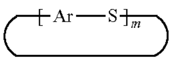

(Q)

Examples of Ar may include units represented by Formula (A) to Formula (L) described above, similarly to the PAS. Formula (A) is especially preferred.

The cyclic PAS may contain repeating units such as Formula (A) to Formula (L) described above randomly or in blocks, or may be any mixture thereof. Their representative examples may include cyclic polyphenylene sulfide, cyclic polyphenylene sulfide sulfone, and cyclic polyphenylene sulfide ketone; cyclic random copolymers and cyclic block copolymers containing these; and mixtures thereof. Particularly preferred examples of the cyclic PAS include a cyclic polyphenylene sulfide (cyclic PPS) containing the p-phenylene unit represented by the following formula at not less than 80 mol %, especially at not less than 90 mol % as a main constituent unit.

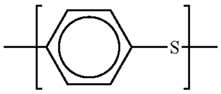

In the cyclic PAS, the number of repetitions m in Formula (Q) is not limited, and it may be, for example, preferably 2 to 50, more preferably 3 to 40, still more preferably 4 to 30. The cyclic PAS may be either a single compound having a single number of repetitions, or a mixture of cyclic PAS's having different numbers of repetitions. A mixture of cyclic PAS's having different numbers of repetitions is more often obtained.

The linear PAS oligomer is a linear oligomer containing a repeating unit of the formula —(Ar—S)— as a main constituent unit, wherein Ar is the same as the structure described above in the section of (1) polyarylene sulfide. The number of repetitions of the main constituent unit of the linear PAS oligomer is not limited. In the chloroform-extractable components, the number of repetitions may be, for example, preferably 2 to 20, more preferably 2 to 10. The linear PAS oligomer may be either a single compound having a single number of repetitions, or a mixture of linear PAS oligomers having different numbers of repetitions. A mixture of linear PAS oligomers having different numbers of repetitions is more often obtained.

We obtain a PAS that generates less mold deposits, by reducing oligomer components having relatively low volatility (high boiling points) that are adhered and deposited on the mold during molding. Such oligomer components have been found to almost correspond to the chloroform-extractable components. Thus, it is important to remove and reduce the chloroform-extractable components in the PAS. The smaller the amount of chloroform-extractable components in the PAS, the more the mold deposits during molding decrease. We found that, by reducing the amount of chloroform-extractable components in the PAS to not more than 1.7% by weight, the mold deposits during molding tend to be improved. Accordingly, in the later-mentioned Step 3, the PAS needs to be washed with an organic solvent to reduce the amount of chloroform-extractable components in the PAS to not more than 1.7% by weight. Regarding the lower limit of the amount of chloroform-extractable components in the PAS, the smaller the amount of such components, the more preferred from the viewpoint of reducing the mold deposits. Thus, the chloroform-extractable components are most preferably not contained in the PAS at all. In other words, the amount is most preferably 0% by weight. On the other hand, regarding the upper limit, the amount is preferably not more than 1.2% by weight, more preferably not more than 1.0% by weight. When the amount of chloroform-extractable components in the PAS is within the preferred range described above, the mold deposits during molding of the PAS tend to be more clearly improved.

The amount of chloroform-extractable components in the PAS was herein calculated by weighing 10 g of PAS, subjecting the PAS to soxhlet extraction with 100 g of chloroform for 3 hours, distilling away chloroform from the resulting extract, weighing the component obtained thereafter, and then calculating its ratio to the weight of the charged polymer.

As described above, the smaller the amount of chloroform-extractable components in the PAS, the more preferred from the viewpoint of reducing the mold deposits during molding of the PAS. However, chloroform-extractable components in a PAS, when they are present in various resins, are known to show an effect that makes it easier to flow when melting, to thereby decrease the melt viscosity. Therefore, when importance is placed on such an effect, the existence of a certain amount of chloroform-extractable components in the PAS may be acceptable. Cyclic PAS's, because of their cyclicity, are known to have a potential for practical application to high-performance materials and functional materials. For example, they are known to have properties as compounds having an inclusive nature, and to be applicable in various ways as monomers effective for synthesis of high-molecular-weight linear polymers. Therefore, since the chloroform-extractable components removed and recovered from the PAS can be applied, when necessary, to other uses after the separation and recovery of the PAS, rather than being simply discarded as unnecessary substances. In view of this, our method can be said to be an industrially preferred method.

(3) Sulfidating Agent

The sulfidating agent is not limited as long as it is an agent capable of introducing a sulfide bond to a dihalogenated aromatic compound. Examples of the sulfidating agent include alkali metal sulfides and alkali metal hydrosulfides. Specific examples of the alkali metal sulfides include sodium sulfide, potassium sulfide, lithium sulfide, rubidium sulfide, and cesium sulfide. Sodium sulfide is especially preferably used. These alkali metal sulfides may be used as a hydrate or a mixture with water, or in the form of an anhydride.

Specific examples of the alkali metal hydrosulfides include sodium hydrosulfide, potassium hydrosulfide, lithium hydrosulfide, rubidium hydrosulfide, and cesium hydrosulfide. Sodium hydrosulfide is especially preferably used. These alkali metal hydrosulfides may be used as a hydrate or a mixture with water, or in the form of an anhydride.

The sulfidating agent may be used in combination with an alkali metal hydroxide and/or alkaline earth metal hydroxide. Specific examples of the alkali metal hydroxide include sodium hydroxide, potassium hydroxide, lithium hydroxide, rubidium hydroxide, and cesium hydroxide. Specific examples of the alkaline earth metal hydroxide include calcium hydroxide, strontium hydroxide, and barium hydroxide. Sodium hydroxide is especially preferably used.

When an alkali metal hydrosulfide is used as the sulfidating agent, it is especially preferably used at the same time as an alkali metal hydroxide. The amount of the alkali metal hydroxide used per 1 mole of the alkali metal hydrosulfide may be, for example, preferably 0.95 moles to 1.20 moles, more preferably 1.00 mole to 1.15 moles, still more preferably 1.005 moles to 1.100 moles. Although the sulfidating agent may be introduced at any timing in the system, the agent is preferably introduced before carrying out the later-mentioned dehydration operation.

(4) Dihalogenated Aromatic Compound

The dihalogenated aromatic compound means a compound containing an aromatic ring, having two halogen atoms in one molecule, and having a molecular weight of not more than 1000. Specific examples of the dihalogenated aromatic compound include benzene dihalogenated such as p-dichlorobenzene, m-dichlorobenzene, o-dichlorobenzene, p-dibromobenzene, m-dibromobenzene, o-dibromobenzene, 1-bromo-4-chlorobenzene, and 1-bromo-3-chlorobenzene; benzene dihalogenated also containing a substituent group other than halogens such as 1-methoxy-2,5-dichlorobenzene, 1-methyl-2,5-dichlorobenzene, 1,4-dimethyl-2,5-dichlorobenzene, 1,3-dimethyl-2,5-dichlorobenzene, and 3,5-dichlorobenzoic acid; and dihalogenated aromatic compounds such as 1,4-dichloronaphthalene, 1,5-dichloronaphthalene, 4,4'-dichlorobiphenyl, 4,4'-dichlorodiphenyl ether, 4,4'-dichlorodiphenyl sulfone, and 4,4'-dichlorodiphenyl ketone. In particular, dihalogenated aromatic compounds containing a benzene p-dihalogenated represented by p-dichlorobenzene as a major component are preferred. The dihalogenated aromatic compound especially preferably contains 80 to 100 mol % p-dichlorobenzene, still especially preferably contains 90 to 100 mol % p-dichlorobenzene. For the production of a PAS copolymer, two or more kinds of different dihalogenated aromatic compounds may be used in combination.

The amount of the dihalogenated aromatic compound used per 1 mole of sulfur of the sulfidating agent may be, for example, preferably 0.1 moles to 3 moles, more preferably 0.5 moles to 2 moles, still more preferably 0.9 moles to 1.2 moles. When the amount of the dihalogenated aromatic compound used is within the preferred range described above, the molecular weight of the PAS can be easily controlled to within the preferred range, and a PAS in which the amount of chloroform-extractable components is small can be obtained.

Although the dihalogenated aromatic compound may be introduced in the system at any timing, it is preferably introduced after carrying out the later-mentioned dehydration operation. The method of adding the compound is not limited to the addition of the whole amount all at once. A method in which the compound is introduced step by step may also be employed.

(5) Organic Polar Solvent

An organic polar solvent is used as a reaction solvent. An organic amide solvent having stable reactivity is especially preferably used. Specific examples of the organic polar solvent include N-alkylpyrrolidones such as N-methyl-2-pyrrolidone, N-ethyl-2-pyrrolidone, and N-cyclohexyl-2-pyrrolidone; caprolactams such as N-methyl-F-caprolactam; and aprotic organic solvents represented by 1,3-dimethyl-2-imidazolidinone, N, N-dimethylacetamide, N, N-dimethylformamide, hexamethylphosphoric acid triamide, dimethyl sulfone, and tetramethylene sulfoxide; and mixtures of these. N-methyl-2-pyrrolidone is especially preferably used.

Regarding the amount of the organic polar solvent, the amount of the organic polar solvent in the reaction system per 1 mole of sulfur of the sulfidating agent may be, for example, preferably 0.5 moles to 10 moles, more preferably 2 moles to 8 moles. When the amount of the organic polar solvent is within the preferred range described above, there is a tendency that unfavorable reactions hardly occur, and hence that the degree of polymerization can be easily increased. The amount of the organic polar solvent in the reaction system herein is the amount calculated by subtracting the amount of the organic polar solvent removed to the outside of the reaction system, from the amount of the organic polar solvent introduced in the reaction system. The organic polar solvent may be introduced in the system at any timing. However, when the later-mentioned dehydration operation is carried out, part of the organic polar solvent tends to fly away to the outside of the system. Therefore, a method in which the minimum amount of the organic polar solvent required for the dehydration is introduced before the dehydration operation, and the organic polar solvent is additionally introduced after the completion of the dehydration operation such that the preferred amount of use is achieved, is preferably employed.

(6) Water

The water means the water directly added when the raw materials are added, the accompanying water introduced together with the sulfidating agent, the dihalogenated aromatic compound, and the organic polar solvent, the water produced during the reaction and the like. The amount of water present in the system at the start of the reaction is defined as the amount calculated by subtracting the water distilled off to the outside of the system by the dehydration operation, from the total of the waters described above. The presence of water has an effect that increases solubility of the sulfidating agent in the organic polar solvent, thereby contributing to reaction promotion. On the other hand, excessive water has an effect that decreases nucleophilicity of the sulfidating agent to cause reaction delay, or to increase the pressure in the system. Therefore, it is important to control the amount of water present in the system to within a preferred range.

Regarding the lower limit of the preferred range of the amount of water present in the system at the start of the reaction, the amount of water per 1 mole of sulfur of the sulfidating agent is preferably as close to 0 moles as possible. From the viewpoint of the practical lower limit for carrying out our method, the amount of water may be, for example, not less than 0.01 moles per 1 mole of sulfur of the sulfidating agent. Regarding the upper limit, the amount of water may be, for example, preferably not more than 2.5 moles, more preferably not more than 2.0 moles. When the amount of water at the start of the reaction is within the preferred range described above, the reaction rate tends to be high, and by-products tend to be suppressed. Further, there is a tendency that a pressure increase in the system can be further suppressed, and hence that the cost of introduction of an equipment with high pressure resistance can be reduced.

When the amount of water at the start of the reaction exceeds the preferred amount of water described above, the amount of water can be adjusted by carrying out an operation for reducing the amount of water in the reaction system by dehydration operation. The method of carrying out the dehydration operation is not limited. Examples of the method that may be employed include a method in which the raw materials to be charged are preliminarily dehydrated, a method in which a mixture to which one or more components selected from the sulfidating agent, the dihalogenated aromatic compound, and the organic polar solvent are not added is dehydrated, and a method in which a mixture containing the sulfidating agent, the dihalogenated aromatic compound, and the organic polar solvent is dehydrated after the preparation of the mixture. Although any of these methods may be employed, it is preferred to employ a method in which a mixture to which the dihalogenated aromatic compound is not added is subjected to dehydration operation from the viewpoint of accurately controlling the amount of the dihalogenated aromatic compound, which is likely to fly away due to heating. The temperature for heating the mixture at this time cannot be clearly specified since it may largely vary depending on the combination of the sulfidating agent and the organic polar solvent used, the ratio of the mixture to water, and the like. Regarding the lower limit, the temperature may be, for example, not less than 150° C., preferably not less than 160° C., more preferably not less than 170° C. Regarding the upper limit, the temperature may be, for example, not more than 250° C., preferably not more than 230° C. When the heating temperature during the dehydration is within the preferred range described above, the dehydration can be efficiently carried out while suppressing flying away of the added sulfidating agent to the outside of the system as hydrogen sulfide. The pressure condition during the dehydration is also not limited, and any of normal pressure, decompression pressure, and pressurized pressure may be employed. For efficient distillation of water, the dehydration is preferably carried out under normal pressure or decompression pressure. The normal pressure herein means a pressure close to the pressure in the standard state of the atmosphere, that is, an atmospheric pressure condition at a temperature of about 25° C. at an absolute pressure of about 101 kPa. The atmosphere in the system is preferably a non-oxidizing atmosphere, and is preferably an atmosphere of an inert gas such as nitrogen, helium, or argon. From the viewpoint of economical efficiency and ease of handling, the dehydration is more preferably carried out under nitrogen atmosphere.

(7) Method of Producing Polyarylene Sulfide

A PAS is produced by reacting a mixture containing at least a sulfidating agent, a dihalogenated aromatic compound, and an organic polar solvent under heat, and, after the end of the reaction for producing the PAS, Steps 1, 2, 3 and 4 are carried out to obtain a PAS.

Step 1: A step in which the organic polar solvent is distilled off from the reaction mixture obtained at the end of the reaction, to obtain a solid content containing the PAS.

Step 2: A step which follows Step 1, wherein the solid content containing the PAS is washed with water.

Step 3: A step which follows Step 2, wherein the PAS is washed with an organic solvent such that the amount of chloroform-extractable components in the PAS becomes not more than 1.7% by weight.

Step 4: A step which follows Step 3, wherein the PAS is heated under a flow of an inert gas at a flow rate of not less than 0.2 L/minute per 1 kg of the PAS, to distill off the organic solvent used in Step 3.

These are described below in detail.

(7-1) Generation of PAS

A mixture containing at least a sulfidating agent, a dihalogenated aromatic compound, and an organic polar solvent is reacted under heat to generate a PAS.

The temperature at which the mixture is heated to allow the reaction to proceed cannot be generally specified since it depends on the types and the amounts of the raw materials used. Regarding the lower limit, the temperature may be, for example, not less than 120° C., preferably not less than 180° C., more preferably not less than 220° C., still more preferably not less than 240° C. On the other hand, regarding the upper limit of the range, the temperature may be, for example, not more than 350° C., preferably not more than 320° C., more preferably not more than 310° C., still more preferably not more than 300° C. When the temperature at which the mixture is heated to allow the reaction to proceed is within the preferred range described above, a PAS showing normal physical properties can be more efficiently obtained.

When the temperature at which the mixture is heated to allow the reaction to proceed exceeds the reflux temperature of the mixture under normal pressure, examples of the method of heating the mixture at such a temperature may include a method in which the mixture is heated under a pressure higher than normal pressure, and a method in which the mixture is placed in a pressure resistant container followed by sealing the container and heating the mixture. The normal pressure means a pressure close to the standard state of the atmosphere, and the standard state of the atmosphere means an atmospheric pressure condition at a temperature of about 25° C. at an absolute pressure of about 101 kPa. The reflux temperature means the temperature at which the liquid component of the mixture repeats boiling and condensation. The reaction may be any of a reaction that is carried out at a constant temperature, a multi-step reaction in which the temperature is increased step by step, and a reaction in the form in which the temperature is continuously changed.

The length of time of heating the mixture to allow the reaction to proceed cannot be generally specified since it depends on the types and the amounts of the raw materials used, and the reaction temperature. Regarding the lower limit, the length of time may be, for example, preferably not less than 0.5 hours, more preferably not less than 1 hour. Regarding the upper limit, the length of time may be, for example, preferably not more than 20 hours, more preferably not more than 10 hours. When the length of time of heating the mixture to allow the reaction to proceed is within the preferred range described above, the raw materials can be sufficiently consumed in the reaction, and a PAS can be efficiently produced in a shorter length of time.

The pressure in the reaction system cannot be generally specified since it depends on the raw materials constituting the mixture, the composition, the reaction temperature, and the progress of the reaction. Preferably, regarding the lower limit of the pressure at the reaction temperature, the gauge pressure may be, for example, preferably not less than 0.25 MPa, more preferably not less than 0.3 MPa. Regarding the upper limit, the gauge pressure may be, for example, preferably not more than 5 MPa, more preferably not more than 3 MPa, still more preferably not more than 2 MPa. When the pressure in the reaction system is within the preferred range described above, the sulfidating agent and the dihalogenated aromatic compound as raw materials tend to be quickly consumed in the reaction, and there is a tendency that use of an expensive pressure-resistant equipment can be avoided. To adjust the pressure in the reaction system to within the preferred range described above, the inside of the reaction system may be pressurized by an inert gas in an optional stage such as a stage before the start of the reaction or during the reaction, preferably before the start of the reaction. The gauge pressure means the relative pressure calculated using the atmospheric pressure as the standard, and has the same meaning as the pressure difference calculated by subtracting the atmospheric pressure from the absolute pressure.

To generate a PAS, a mixture containing at least a sulfidating agent, a dihalogenated aromatic compound, and an organic polar solvent is reacted under heat, and, after the end of this reaction, Step 1 is carried out. The "end of reaction" means a state where the reaction has proceeded until the conversion rate of the dihalogenated aromatic compound added has become not less than 97%. By reacting the dihalogenated aromatic compound to such a conversion rate, and then carrying out the later-mentioned Step 1, the amount of chloroform-extractable components in the obtained PAS can be reduced. The reaction is regarded as having ended at the time point when the conversion rate of the dihalogenated aromatic compound has become not less than 97%. However, a method in which the conversion rate of the dihalogenated aromatic compound is further increased by further continuation of the reaction is also preferably employed. In this example, regarding the lower limit of a more preferred range of the conversion rate of the dihalogenated aromatic compound in the reaction, the conversion rate may be, for example, more preferably not less than 98%, still more preferably not less than 98.5%. On the other hand, the upper limit cannot be generally specified since the rate may exceed 100% in accordance with the calculation equation, and since the rate may vary depending on the amount of the dihalogenated aromatic compound used. It can be said, however, that the preferred upper limit is the conversion rate obtained when the entire dihalogenated aromatic compound used is converted. When the conversion rate of the dihalogenated aromatic compound is within the preferred range described above, the amount of chloroform-extractable components in the obtained PAS tends to further decrease. The amount of the dihalogenated aromatic compound remaining in the reaction solution is estimated by gas chromatography, and the conversion rate of the dihalogenated aromatic compound is calculated from its ratio to the amount of the sulfidating agent added or the dihalogenated aromatic compound added. The calculation equation is as follows.

(a) when the Dihalogenated Aromatic Compound is Used in Excess in Terms of the Molar Ratio Relative to the Sulfidating Agent Conversion rate of dihalogenated aromatic compound (%)=[amount of dihalogenated aromatic compound added (in moles)−amount of remaining dihalogenated aromatic compound (in moles)]/amount of sulfidating agent added (in moles)×100

(b) when Other than the Above (a)

Conversion rate of dihalogenated aromatic compound (%)=[amount of dihalogenated aromatic compound added (in moles)−amount of remaining dihalogenated aromatic compound (in moles)]/amount of dihalogenated aromatic compound (in moles)×100

The amount of the sulfidating agent added herein means the amount of the sulfidating agent present in the system at the start of the reaction. When part of the sulfidating agent is removed as hydrogen sulfide to the outside of the system by the dehydration operation before the start of the reaction, the amount of the sulfidating agent present in the system at the start of the reaction is estimated taking into account the number of moles of the hydrogen sulfide that has flown away.

The amount of the dihalogenated aromatic compound added means the amount of the dihalogenated aromatic compound present in the system at the start of the reaction. When the part of the dihalogenated aromatic compound is removed to the outside of the system by the dehydration operation before the start of the reaction, the amount of the dihalogenated aromatic compound present in the system at the start of the reaction is estimated taking into account the number of moles of the dihalogenated aromatic compound that has flown away.

(7-2) Step 1

Step 1 is a step of distilling off the organic polar solvent from the reaction mixture obtained by the reaction for generating the PAS, to obtain a solid content containing the PAS. The solid content obtained by this operation contains not only the PAS, but also water-soluble substances such as by-product salt and unreacted sulfidating agent. By this operation, the organic polar solvent can be simply recovered, and there is therefore a tendency that the cost of the production of the PAS can be suppressed.

The method of distilling off the organic polar solvent from the reaction mixture to obtain the solid content containing the PAS is not limited. Examples of the method may include a method in which the obtained reaction mixture is heated to not less than the boiling point of the organic polar solvent to distill off the organic polar solvent, and a method in which the reaction mixture is heated in a sealed state using a pressure-resistant reactor comprising an extraction port at the bottom of the container, and then the reaction mixture, which has been heated to not less than the temperature corresponding to the boiling point at normal temperature, is extracted by opening the extraction port at the bottom of the container into an atmosphere under normal pressure or decompression pressure, to thereby allow instant vaporization of the organic polar solvent (flash method).

The temperature at which the organic polar solvent is distilled off in Step 1 is not limited as long as it is not less than the boiling point of the organic polar solvent used. Regarding the lower limit, the temperature may be, for example, preferably not less than 200° C., more preferably not less than 220° C., still more preferably over 220° C. On the other hand, regarding the upper limit, the temperature may be, for example, preferably not more than 250° C., more preferably not more than 240° C. When the temperature at which the organic polar solvent is distilled off in Step 1 is within the preferred range described above, there is a tendency that the distilling off of the organic polar solvent can be completed in a relatively short time. Further, since fusion of the generated PAS particles to each other can be prevented, there is a tendency that formation of large clusters by the solid content obtained after the flashing can be prevented, leading to formation of powdery granules that can be easily handled. Further, the specific surface area of the obtained PAS particles tends to increase, and there is a tendency that, when the PAS is washed with an organic solvent in the later-mentioned Step 3, the amount of chloroform-extractable components in the PAS can be more easily reduced due to this effect. The temperature at which the organic polar solvent is distilled off in Step 1 means the internal temperature rather than the temperature of the container.

When the organic polar solvent is distilled off by heating the reaction mixture to not less than the boiling point of the organic polar solvent, any of normal pressure, decompression pressure, and pressurized pressure may be employed as the pressure condition. It is preferred to employ a decompression pressure condition. Under such a preferred pressure condition, the distillation speed of the organic polar solvent can be increased, and there is a tendency that an additional effect that allows removal of oligomer components and other volatile impurities as well as the organic polar solvent can be obtained.

Also, when the flash method described above is employed, the conditions are not limited. Examples of the method under preferred conditions may include a method in which a reaction mixture under high-temperature high-pressure conditions, usually at not less than 250° C. and not less than 0.8 MPa, is released in a gas stream of high-temperature high-pressure steam controlled to about 290° C. and 5 $kg/cm^2$ to 20 $kg/cm^2$, which gas stream is allowed to flow at a flow rate of 50 kg/hr to 5,000 kg/hr. The supply speed of the reaction mixture in this process is preferably 0.5 kg/hr to 5,000 kg/hr. In such a preferred method, there is a tendency that oligomer components and other volatile impurities accompanying the steam can be efficiently removed, and that formation of large clusters by the solid content obtained after the flashing can be prevented, leading to formation of powdery granules that can be easily handled.

The temperature of the container from which the reaction mixture is extracted in the flash method is not limited as long as it is not less than the boiling point of the employed organic polar solvent at normal pressure. Regarding the lower limit, the temperature may be, for example, preferably not less than 200° C., more preferably not less than 220° C. On the other hand, regarding the upper limit, the temperature may be, for example, preferably not more than 250° C., more preferably not more than 240° C. When the temperature of the container from which the reaction mixture is extracted in the flash method is within the preferred range described above, there is a tendency that the distilling off of the organic polar solvent can be completed in a relatively short time, that fusion of the generated PAS particles to each other can be prevented, and that formation of large clusters by the solid content obtained after the flashing can be prevented, leading to formation of powdery granules that can be easily handled. Further, the specific surface area of the obtained PAS particles tends to increase, and there is a tendency that, when the PAS is washed with an organic solvent in the later-mentioned Step 3, the amount of chloroform-extractable components in the PAS can be more easily reduced due to this effect.

As described above, in Step 1, a solid content containing the PAS is obtained by distilling off the organic polar solvent from the reaction mixture obtained by the reaction. One excellent characteristic of this operation is that the organic polar solvent can be recovered at low cost. Since the obtained reaction mixture contains water-soluble substances such as by-product salt and unreacted sulfidating agent as well as the PAS, washing with water needs to be carried out to a considerable degree in the process of recovery of the PAS. The filtrate generated in this process often contains all of water, water-soluble substances, and the organic polar solvent. When the organic polar solvent is recovered from such a filtrate by a distillation operation or the like, a high cost tends to be required since water is a substance having large evaporation latent heat. Therefore, the production cost of the PAS tends to remarkably increase as a result. The above examples can be avoided by recovering the organic polar solvent first so that the PAS can be produced at low cost.

(7-3) Step 2

Step 2 is a step following Step 1. In this step, the solid content containing the PAS is washed with water to remove water-soluble substances. The solid content obtained after distilling off the organic polar solvent in Step 1 contains not only the PAS, but also water-soluble substances such as by-product salt and unreacted sulfidating agent. Therefore, by carrying out washing with water in the following step, Step 2, those water-soluble substances are removed.

The method of removing the water-soluble substances by washing the solid content containing the PAS with water is not limited. Examples of the method may include a method in which water is added to the solid content containing the PAS, and the resulting mixture is slurried, followed by carrying out solid-liquid separation by an operation such as filtration or centrifugation, and then separating and recovering the PAS as a solid content, to remove the water-soluble substances into the filtrate side, and a method in which the PAS is spread on a filter medium and then washed in the shower of water. The slurrying operation described above is preferably carried out with stirring from the viewpoint of efficiently removing the water-soluble substances.

When the water-soluble substances are removed by washing the solid content containing the PAS with water, the bath ratio (weight bath ratio) of the amount of water to the amount of the PAS is not limited. Regarding the lower limit, the bath ratio to the PAS weight may be, for example, not less than 1, preferably not less than 2, more preferably not less than 3. On the other hand, regarding the upper limit, the bath ratio to the PAS weight may be, for example, not more than 100, preferably not more than 50, more preferably not more than 20. When the bath ratio for the removal of the water-soluble substances by washing of the solid content containing the PAS with water is within the preferred range described above, there is a tendency that the water-soluble substances can be efficiently removed. Further, when the solid-liquid separation is carried out by an operation such as filtration or centrifugation after the slurrying, the length of time required for the process tends to be short.

The temperature for the removal of the water-soluble substances by washing of the solid content containing the PAS with water (slurry temperature) is not limited. Regarding the lower limit, the temperature may be, for example, not less than 0° C., preferably not less than 100° C., more preferably not less than 150° C., still more preferably not less than 170° C., still more preferably not less than 180° C. On the other hand, regarding the upper limit, the temperature may be, for example, not more than 250° C., preferably not more than 220° C., more preferably not more than 200° C. When the temperature for the removal of the water-soluble substances by washing of the PAS with water is within the preferred range described above, the internal pressure of the apparatus tends not to excessively increase, and there is a tendency that the water-soluble substances embraced in the PAS particles can be efficiently extracted. The method of increasing the temperature to not less than the boiling point of water is not limited, and may be, for example, a method in which the PAS and water are placed in a pressure resistant container, and the resulting mixture is slurried, followed by sealing the container and heating the mixture.

The stirring time for the removal of the water-soluble substances by washing of the solid content containing the PAS with water is not limited. Regarding the lower limit, the stirring time may be, for example, not less than 0.1 minutes, preferably not less than 1 minute. Regarding the upper limit, the stirring time may be, for example, not more than 3 hours, preferably not more than 1 hour. When the stirring time for the removal of the water-soluble substances by washing of the PAS with water is within the preferred range described above, there is a tendency that the water-soluble substances contained in the PAS can be efficiently extracted.

When the solid content containing the PAS is slurried with water, and then the solid-liquid separation is carried out by the operation such as filtration or centrifugation, the temperature in the solid-liquid separation apparatus is also not limited. Regarding the lower limit, the temperature may be, for example, not less than 0° C., preferably not less than 20° C., more preferably not less than 50° C. On the other hand, regarding the upper limit, the temperature may be, for example, not more than 100° C. When the temperature in the solid-liquid separation apparatus is within the preferred range described above, the solid-liquid separation operation can be carried out using a simple apparatus without being affected by the boiling point or melting point of water at normal pressure.

The number of times of the operation of removing the water-soluble substances by washing of the solid content containing the PAS with water is also not limited. When the operation is carried out only once, the water-soluble substances derived from the mother liquid in the solid content obtained after the separation tend to remain so that the washing operation is preferably carried out two or more times. By carrying out the washing operation a plurality of times like this, further removal of the water-soluble substances is possible.

The atmosphere during the removal of the water-soluble substances by washing the solid content containing the PAS with water is not limited, and the removal may be carried out in the air without any problem. However, from the viewpoint of preventing degradation or oxidation of end groups, this operation is preferably carried out in a non-oxidizing atmosphere. In this example, the atmosphere is preferably an atmosphere of an inert gas such as nitrogen, helium, or argon. From the viewpoint of economical efficiency and ease of handling, the operation is more preferably carried out under nitrogen atmosphere.

In the washing of the solid content containing the PAS with water, a method in which an acid is added to the water used is also preferably employed since the metal content in the PAS tends to decrease in this instance. The acid added is not limited as long as it does not show an action that causes oxidation, degradation, or deterioration of the PAS. Either an inorganic acid or an organic acid may be used. The acid washing is preferably carried out under conditions where the slurry pH during the acid washing is less than 7. The pH is controlled by adjusting the type of the acid selected from inorganic acids and organic acids, and the amount of the acid added. Examples of the acid added include acetic acid, hydrochloric acid, dilute sulfuric acid, phosphoric acid, silicic acid, carbonated water, and propyl acid. These acids may be used individually or as a mixture. In particular, from the viewpoint of the cost, acetic acid or hydrochloric acid is preferably used. After carrying out the washing with the water containing the acid, it is preferred to additionally carry out washing with ordinary water at least one or more times to prevent the added acid from remaining in the PAS.

The washing of the PAS with the water containing the acid is preferably carried out in an inert atmosphere to prevent degradation or oxidation of end groups of the PAS.

In Step 2, the PAS becomes under wet conditions after the washing with water. Thereafter, the PAS may be subjected to drying. Since water is a poor solvent of the chloroform-extractable components in the PAS, the drying of the PAS in Step 2 tends to lead to an increased washing effect in the washing of the PAS with an organic solvent in the subsequent Step 3. When the organic solvent used in Step 3 is water-insoluble, the washing effect tends not to change irrespective of whether the PAS is under dry conditions or wet conditions. Therefore, the PAS does not necessarily need to be dried in Step 2.

When the drying is carried out after the washing of the PAS with water in Step 2, fusion of PAS particles tends to occur when the drying temperature is too high, leading to a smaller specific surface area. In such instances, there is a tendency that a sufficient washing effect cannot be produced in the later-mentioned Step 3. Therefore, regarding the lower limit, the drying temperature may be, for example, preferably not less than 70° C., more preferably not less than 100° C., still more preferably not less than 120° C. Regarding the upper limit, the drying temperature may be, for example, preferably not more than 170° C., more preferably not more than 150° C. When the drying temperature for the PAS is within the preferred range described above, the specific surface area of the PAS after the drying tends to be sufficiently large so that there is a tendency that the chloroform-extractable components in the PAS can be sufficiently removed by washing in the later-mentioned Step 3. Further, there is a tendency that the PAS can be efficiently dried in a short time. The atmosphere for the drying is preferably a non-oxidizing atmosphere, and preferably an atmosphere of an inert gas such as nitrogen, helium, or argon. From the viewpoint of economical efficiency and ease of handling, the drying is more preferably carried out under nitrogen atmosphere. There is a tendency that, by drying the PAS in such an atmosphere, degeneration of the PAS due to oxidation can be prevented.

When the PAS is dried after the washing with water in Step 2, the drying time is not limited. Regarding the lower limit, the drying time may be, for example, not less than 0.5 hours, preferably not less than 1 hour. Regarding the upper limit, the drying time may be, for example, not more than 50 hours, preferably not more than 20 hours, more preferably not more than 10 hours. When the drying time for the PAS is within the preferred range described above, the PAS can be efficiently industrially produced.

When the PAS is dried after the washing with water in Step 2, the dryer used is not limited. A common vacuum dryer or hot air dryer may be used. A revolver-type heating apparatus or a heating apparatus equipped with a stirring blade, a fluidized bed dryer, or the like may also be used. From the viewpoint of efficiently and uniformly drying the PAS, a revolver-type heating apparatus or a heating apparatus equipped with a stirring blade is preferably used for the drying.

(7-4) Step 3

Step 3 is a step following Step 2. In this step, the PAS is washed with an organic solvent such that the amount of chloroform-extractable components in the PAS becomes not more than 1.7% by weight. When the PAS production is carried out by our preferred method, the amount of chloroform-extractable components in the PAS often becomes 2.0% by weight to 5.0% by weight at the time when Step 2 is completed (although the amount tends to be affected especially by the amount of the organic polar solvent used in the reaction). As described above, the chloroform-extractable components in the PAS have been confirmed to be causative substances of mold deposits during molding of the PAS. Thus, by carrying out Step 3 to reduce the content of the chloroform-extractable components in the PAS, the mold deposits during molding can be reduced.

In Step 3, the amount of chloroform-extractable components in the PAS needs to be reduced to not more than 1.7% by weight by washing the PAS with an organic solvent. When the amount of chloroform-extractable components in the PAS exceeds 1.7% by weight, the mold deposits during molding of the PAS are not clearly improved so that the desired effect cannot be obtained. Regarding the lower limit of the amount of chloroform-extractable components in the PAS, the smaller the amount of such components, the more preferred from the viewpoint of reducing the mold deposits. Thus, the chloroform-extractable components are most preferably not contained in the PAS at all. In other words, the amount is most preferably 0% by weight. On the other hand, regarding the upper limit, the amount is more preferably not more than 1.2% by weight, still more preferably not more than 0.9% by weight. When the amount of chloroform-extractable components in the PAS is within the preferred range described above, the mold deposits during molding of the PAS tend to be more clearly improved.

The organic solvent used for washing the PAS in Step 3 is not limited as long as the chloroform-extractable components in the PAS are highly soluble, but the PAS is poorly soluble, in the organic solvent, and as long as the organic solvent does not show an action that causes oxidation, degradation, or deterioration of the PAS. Examples of the organic solvent may include amide polar solvents such as N-methyl-2-pyrrolidone, dimethylformamide, dimethylacetamide, and dimethylimidazolidinone; sulfoxide/sulfone solvents such as dimethyl sulfoxide and dimethyl sulfone; ketone solvents such as acetone, methyl ethyl ketone, 3-pentanone, and acetophenone; ether solvents such as dimethyl ether, diethyl ether, dipropyl ether, tetrahydrofuran, and diphenyl ether; ester solvents such as methyl acetate, ethyl acetate, and butyl acetate; nitrile solvents such as acetonitrile; halogen solvents such as chloroform, methylene chloride, trichlorethylene, dichloroethylene, 1,2-dichloroethane, tetrachloroethane, chlorobenzene, and 1-chloronaphthalene; alcohol/phenolic solvents such as methanol, ethanol, propanol, isopropanol, butanol, pentanol, ethylene glycol, propylene glycol, phenol, cresol, and polyethylene glycol; and aliphatic/aromatic hydrocarbon solvents such as n-hexane, cyclohexane, benzene, toluene, and p-xylene. In particular, N-methyl-2-pyrrolidone, dimethylformamide, tetrahydrofuran, chloroform, 1-chloronaphthalene, toluene, or p-xylene may be preferably employed since the chloroform-extractable components in the PAS tend to be highly soluble therein. Further, N-methyl-2-pyrrolidone, which is often used also as a polymerization solvent for PAS, is especially preferably employed from the viewpoint of ease of obtaining. These organic solvents may be used either individually or as a mixed solvent of two or more thereof.

The amount of chloroform-extractable components in the PAS is measured by the following method. First, 10 g of PAS is weighed and then subjected to soxhlet extraction with 100 g of chloroform for 3 hours. The weight after distilling off chloroform from the resulting extract is measured, and its ratio to the weight of the charged polymer is calculated to determine the amount of chloroform-extractable components.

Step 4 is a process of distilling off the organic solvent used in Step 3, by heating under a flow of an inert gas. When Step 4 is carried out under preferred conditions, the amount of chloroform-extractable components in the PAS hardly changes due to Step 4. Therefore, the amount of chloroform-extractable components in the PAS after carrying out Step 3 was evaluated based on the amount of chloroform-extractable components in the PAS after carrying out Step 4.

In Step 3, the water content in the PAS before the washing with the organic solvent is preferably not more than 30% by weight. Since water is a poor solvent of the chloroform-extractable components in the PAS, when the water content in the PAS is preliminarily reduced, there is a tendency that the chloroform-extractable components can be be more easily reduced by the washing of the PAS with the organic solvent. When the organic solvent used for the washing of the PAS in Step 3 is a water-insoluble organic solvent such as chloroform or toluene, a stable washing effect tends to be obtained irrespective of the water content in the PAS so that the water content in the PAS does not necessarily need to be not more than 30% by weight. However, taking into account the fact that N-methyl-2-pyrrolidone, which is an especially preferred washing solvent from the viewpoint of ease of obtaining, is a water-soluble organic solvent, preliminary reduction of the water content in the PAS can be said to be a more preferred method. Regarding the lower limit of the water content in the PAS before the washing with the organic solvent, the lower the water content, the more preferred from the viewpoint of increasing the washing effect. Thus, water is most preferably not contained in the PAS at all. In other words, the water content is most preferably 0% by weight. On the other hand, regarding the upper limit, the water content may be, for example, more preferably not more than 10% by weight, still more preferably not more than 5% by weight, still more preferably not more than 1% by weight. In Step 3, when the water content in the PAS before the washing with the organic solvent is within the preferred range described above, when a water-soluble organic solvent is used for the PAS washing, there is a tendency that the amount of chloroform-extractable components in the PAS can be more easily reduced. Examples of the method of reducing the water content to not more than 30% by weight include a method in which the PAS is dried after the washing with water in Step 2 as described above.

The measurement of the water content in the PAS is carried out by the Karl Fischer method according to Japanese Industrial Standards JIS K 7251.

In general, in an operation of washing particles with a solvent, the washing efficiency is known to tend to increase as the specific surface area of the particles increases. There is such a tendency also in the washing in Step 3. More specifically, in Step 3, regarding the lower limit, the specific surface area of the PAS before the washing with the organic solvent may be, for example, preferably not less than 5 $m^2/g$, more preferably not less than 8 $m^2/g$, still more preferably not less than 10 $m^2/g$. On the other hand, regarding the upper limit, the specific surface area may be, for example, preferably not more than 50 $m^2/g$. In Step 3, when the specific surface area of the PAS before the washing with the organic solvent is within the preferred range described above, there is a tendency that the amount of chloroform-extractable components in the PAS can be more easily reduced when the PAS is washed with the organic solvent.

In Step 3, the specific surface area of the PAS before the washing with the organic solvent can be adjusted as described above by, for example, adjusting the temperature at which the organic polar solvent is distilled off from the reaction mixture in Step 1, or, when the PAS is dried after the washing with water in Step 2, adjusting the drying temperature. The temperature at which the organic polar solvent is distilled off from the reaction mixture in Step 1 may be, for example, preferably not less than 200° C., more preferably not less than 220° C. regarding the lower limit of the temperature. On the other hand, regarding the upper limit, the temperature may be, for example, preferably not more than 250° C., more preferably not more than 240° C. When the temperature at which the organic polar solvent is distilled off from the reaction mixture in Step 1 is within the preferred range described above, there is a tendency that fusion of the PAS particles to each other can be prevented, and therefore that the specific surface area of the PAS before the washing with the organic solvent in Step 3 can be adjusted to within the preferred range described above. Further, as described in (7-3) Step 2, the drying temperature for the drying of the PAS after the washing with water is preferably 70° C. to 170° C. When the PAS is dried after the washing with water in Step 2, and the drying temperature is within the preferred range described above, there is a tendency that fusion of the PAS particles to each other can be prevented, and therefore that the specific surface area of the PAS before the washing with the organic solvent in Step 3 can be easily adjusted to within the preferred range described above.

In the method of measuring the specific surface area of the PAS, 0.2 g of PAS is weighed and taken into a glass cell, and decompression degassing is carried out at room temperature for 5 hours, followed by performing measurement by the krypton gas adsorption method, and then performing analysis by the multipoint BET theories.

The method of removing the chloroform-extractable components in the PAS by washing the PAS with the organic solvent is not limited. Examples of the method may include a method in which the organic solvent is added to the PAS, and the resulting mixture is slurried, followed by carrying out solid-liquid separation by an operation such as filtration or centrifugation, and then separating and recovering the PAS as a solid content, to remove the chloroform-extractable components in the PAS into the filtrate side, and a method in which the PAS is spread on a filter medium and then washed in the shower of the organic solvent. In the above-described slurrying operation, stirring is preferably carried out from the viewpoint of efficiently removing the chloroform-extractable components in the PAS.

During the removal of the chloroform-extractable components in the PAS by washing the PAS with the organic solvent, the bath ratio (weight bath ratio) of the amount of the organic solvent to the amount of the PAS is not limited. Regarding the lower limit, the bath ratio to the PAS weight may be, for example, not less than 1, preferably not less than 2, more preferably not less than 3. On the other hand, regarding the upper limit, the bath ratio to the PAS weight may be, for example, not more than 100, preferably not more than 50, more preferably not more than 20. When the bath ratio for the removal of the chloroform-extractable components in the PAS by washing the PAS with the organic solvent is within the preferred range described above, there is a tendency that the chloroform-extractable components in the PAS can be efficiently removed. Further, when the solid-liquid separation is carried out by an operation such as filtration or centrifugation after the slurrying, the length of time required for the process tends to be short.

During the removal of the chloroform-extractable components in the PAS by washing the PAS with the organic solvent, the temperature (slurry temperature) is not limited. Regarding the lower limit, the temperature may be, for example, not less than 0° C., preferably not less than 20° C., more preferably not less than 60° C. On the other hand, regarding the upper limit, the temperature may be, for example, not more than 300° C., preferably not more than 250° C., more preferably not more than 200° C., still more preferably not more than 150° C. When the temperature during the removal of the chloroform-extractable components in the PAS by washing the PAS with the organic solvent is within the preferred range described above, there is a tendency that the pressure does not excessively increase, and that the chloroform-extractable components in the PAS can be efficiently extracted. Further, in the process of the solid-liquid separation by an operation such as filtration or centrifugation after the slurrying of the PAS with the organic solvent, the solid-liquid separation speed tends to increase, resulting in higher efficiency of the process. The method of increasing the temperature to not less than the boiling point of the organic solvent is not limited. Examples of the method may include a method in which the PAS and the organic solvent are placed in a pressure resistant container, and the resulting mixture is slurried, followed by sealing the container and heating the mixture.

The stirring time for the removal of the chloroform-extractable components in the PAS by washing the PAS with the organic solvent is not limited. Regarding the lower limit, the stirring time may be, for example, not less than 0.1 minutes, preferably not less than 1 minute, more preferably not less than 5 minutes. Regarding the upper limit, the stirring time may be, for example, not more than 3 hours, preferably not more than 1 hour, more preferably not more than 30 minutes. When the stirring time for the removal of the chloroform-extractable components in the PAS by washing the PAS with the organic solvent is within the preferred range described above, there is a tendency that the chloroform-extractable components can be efficiently extracted.

Further, in the process of the solid-liquid separation by an operation such as filtration or centrifugation after the slurrying of the PAS with the organic solvent, the temperature in the solid-liquid separation apparatus is also not limited. Regarding the lower limit, the temperature may be, for example, not less than 0° C., preferably not less than 20° C., more preferably not less than 60° C. On the other hand, regarding the upper limit, the temperature may be, for example, not more than 300° C., preferably not more than 250° C., more preferably not more than 200° C., still more preferably not more than 150° C. When the temperature in the solid-liquid separation apparatus is within the preferred range described above, the solid-liquid separation operation can be carried out using a simple apparatus rather than using an expensive pressure-resistant equipment. Further, the solid-liquid separation speed tends to increase, resulting in higher efficiency of the process.

Specific examples of the solid-liquid separation operation include operations such as filtration and centrifugation. To reduce the amount of the mother liquid contained in the solid content obtained after the solid-liquid separation, a method in which the solid content is subjected to pressurized pressing after the solid-liquid separation is also preferably employed. There is a tendency that, by carrying out such an additional operation, the amount of the mother liquid contained in the solid content can be reduced, and therefore that the amount of chloroform-extractable components contained in the PAS can be more easily reduced.

The number of times of the operation of removing the chloroform-extractable components in the PAS by washing the PAS with the organic solvent is also not limited. When the operation is carried out only once, the chloroform-extractable components in the PAS, derived from the mother liquid in the solid content obtained after the separation, tend to remain so that the washing operation is preferably carried out two or more times. By carrying out the washing operation a plurality of times, further removal of the chloroform-extractable components is possible.

Regarding the atmosphere during the removal of the chloroform-extractable components in the PAS by washing the PAS with the organic solvent, the removal may be carried out in the air without any problem. From the viewpoint of preventing degradation or oxidation of end groups, this operation is preferably carried out in a non-oxidizing atmosphere. In this example, the atmosphere is preferably an atmosphere of an inert gas such as nitrogen, helium, or argon. From the viewpoint of economical efficiency and ease of handling, the operation is more preferably carried out under nitrogen atmosphere.

(7-5) Step 4

Step 4 is a step following Step 3. In this step, the PAS is heated under a flow of an inert gas at a flow rate of not less than 0.2 L/minute per 1 kg of the PAS, to distill off the organic solvent used in Step 3. By carrying out Step 4, a PAS that generates less mold deposits during molding, having excellent melt fluidity, and having high reactivity with a coupling agent can be obtained.

In Step 4, when the organic solvent used in Step 3 is distilled off by heating the PAS under conditions where the flow rate of the inert gas is less than 0.2 L/minute per 1 kg of the PAS, the PAS tends to undergo heat denaturation, leading to decreased reactivity of the PAS with the coupling agent. In this example, a compound obtained by melt kneading with another resin or inorganic filler tends not to have high hydrolysis resistance. Regarding the lower limit, the flow rate of the inert gas for the distilling off of the organic solvent in Step 4 may be, for example, preferably not less than 0.4 L/minute, more preferably not less than 0.8 L/minute. Regarding the upper limit, the flow rate may be, for example, preferably not more than 50 L/minute, more preferably not more than 25 L/minute. When the flow rate of the inert gas for the distilling off of the organic solvent in Step 4 is within the preferred range described above, there is a tendency that heat denaturation of the PAS can be more suppressed, leading to increased hydrolysis resistance of the compound obtained by melt kneading with another resin or inorganic filler. Evaluation of the hydrolysis resistance of the PAS is carried out as follows. First, pellets are prepared by carrying out extrusion molding (cylinder temperature, 320° C.; charge, 60 parts by weight of PAS and 40 parts by weight of chopped glass fibers (T-760H, manufactured by Nippon Electric Glass Co., Ltd.); epoxy silane coupling agent 2-(3, 4-epoxycyclohexyl)ethyltrimethoxysilane (KBM-303), manufactured by Shin-Etsu Chemical Co., Ltd.). Subsequently, injection molding is carried out according to the ASTM standard (D-638) using the obtained pellets, and the tensile strength of the obtained test piece is measured. Subsequently, the test piece is immersed in Liquid X, which is composed of 54% water, 45% ethylene glycol, 0.5% dipotassium phosphate, and 0.5% diethylene glycol, at 150° C. for 168 hours, and the test piece after the 168 hours of immersion is subjected to measurement of the tensile strength, to calculate the strength retention rate of the tensile strength. This strength retention rate is used as the hydrolysis resistance of the PAS to be evaluated.

The inert gas means a stable gas that does not cause chemical reaction, and nitrogen, helium, or argon may be preferably used. In particular, from the viewpoint of economical efficiency and ease of handling, nitrogen is more preferably used. The oxygen concentration in the apparatus for the distilling off of the organic solvent in Step 4 inevitably tends to be low due to the flow of the inert gas. Regarding the lower limit of the oxygen concentration in the apparatus, the lower the oxygen concentration, the more preferred from the viewpoint of preventing oxidation of the PAS. Thus, oxygen is most preferably not contained in the apparatus at all. In other words, the oxygen concentration is most preferably 0% by volume. On the other hand, regarding the upper limit, the oxygen concentration may be, for example, preferably not more than 1% by volume, more preferably not more than 0.1% by volume, still more preferably not more than 0.01% by volume. When the oxygen concentration in the apparatus for distilling off the organic solvent in Step 4 is within the preferred range described above, there is a tendency that degeneration of PAS due to oxidation can be prevented.

In Step 4, the pressure in the apparatus for the distilling off of the organic solvent is not limited, and any of a normal pressure condition, a decompression pressure condition, and a pressurized pressure condition may be employed. Since the employment of a decompression pressure condition or a pressurized pressure condition requires introduction of an expensive equipment that is resistant to the pressure environment, a normal pressure condition is preferred from the viewpoint of producing the PAS at lower cost. The normal pressure herein means a pressure close to the pressure in the standard state of the atmosphere, that is, an atmospheric pressure condition at a temperature of about 25° C. at an absolute pressure of about 101 kPa.

In Step 4, the temperature at which the organic solvent is distilled off is not limited. Regarding the lower limit, the temperature may be, for example, not less than 70° C., preferably not less than 100° C., more preferably not less than 120° C. Regarding the upper limit, the temperature may be, for example, preferably not more than 250° C., more preferably not more than 230° C. When the drying temperature for the PAS is within the preferred range described above, there is a tendency that the PAS can be efficiently dried in a short time without allowing fusion of the PAS.

The length of time of the distilling off of the organic solvent in Step 4 is not limited. Regarding the lower limit, the length of time may be, for example, not less than 0.1 hours, preferably not less than 1 hour. Regarding the upper limit, the length of time may be, for example, not more than 50 hours, preferably not more than 20 hours, more preferably not more than 10 hours. When the drying time for the PAS is within the preferred range described above, the PAS can be efficiently industrially produced while suppressing heat denaturation of the PAS.

The dryer used for the distilling off of the organic solvent in Step 4 is not limited. A common vacuum dryer or hot air dryer may be used. A revolver-type heating apparatus or a heating apparatus equipped with a stirring blade, a fluidized bed dryer, or the like may also be used. From the viewpoint of efficiently and uniformly drying the PAS, a revolver-type heating apparatus or a heating apparatus equipped with a stirring blade is preferably used for the drying.

When the boiling point of the organic solvent used for the washing in Step 3 is high, the process of distilling off of the organic solvent in Step 4 tends to require a high temperature and a long time. For the purpose of reducing such a tendency, a method in which the organic solvent contained in the PAS is replaced with another solvent having a lower boiling point before carrying out Step 4, followed by drying is also preferably employed. The solvent used for the replacement herein is not limited as long as this solvent is miscible with the solvent used for the washing. Water or acetone is often preferably employed from the viewpoint of the fact that they can be obtained at low cost, and that they have relatively low boiling points. Examples of the method of replacing the organic solvent contained in the PAS with another solvent having a lower boiling point may include a method in which the solvent for the replacement is added to the PAS, and the resulting mixture is slurried, followed by carrying out solid-liquid separation by an operation such as filtration or centrifugation, and a method in which the PAS is spread on a filter medium and then washed in the shower of the solvent for the replacement. This operation is effective even when it is carried out only once. However, there is a tendency that, when the operation is carried out two or more times to allow the solvent replacement to further proceed, the drying treatment can be carried out at lower temperature in a shorter time.

Step 4 is a process of distilling off the organic solvent used in Step 3, by heating under a flow of an inert gas. When Step 4 is carried out under preferred conditions, the amount of chloroform-extractable components in the PAS hardly changes due to Step 4. Therefore, the amount of chloroform-extractable components in the PAS after carrying out Step 3 can be evaluated based on the amount of chloroform-extractable components in the PAS after carrying out Step 4.

(8) Additional Post-Processing

Although the thus obtained PAS can achieve sufficient reduction of mold deposits during molding, a method in which the PAS obtained after carrying out Step 4 is additionally subjected to heat treatment (the curing method) may also be preferably employed for the purpose of further reduction of the mold deposits.

The temperature for the additional heat treatment of the PAS obtained after carrying out Step 4 is not limited. Regarding the lower limit, the temperature may be, for example, not less than 150° C., preferably not less than 160° C. Regarding the upper limit, the temperature may be, for example, not more than 270° C., preferably not more than 260° C. When the temperature for carrying out the heat treatment of the PAS is within the preferred range described above, there is a tendency that the PAS is not excessively heat-denatured, and that the mold deposits generated during molding of the PAS can be further reduced. Further, there is a tendency that the heat treatment can be uniformly carried out without allowing fusion of the PAS.

The length of time of the additional heat treatment of the PAS obtained after carrying out Step 4 is not limited. Regarding the lower limit, the length of time may be, for example, not less than 0.2 hours, preferably not less than 0.3 hours. Regarding the upper limit, the length of time may be, for example, not more than 50 hours, preferably not more than 10 hours, more preferably not more than 6 hours. When the length of time of the heat treatment of the PAS is within the preferred range described above, there is a tendency that the PAS is not excessively heat-denatured, and that the mold deposits generated during molding of the PAS can be further reduced.

When the PAS obtained after carrying out Step 4 is subjected to the additional heat treatment, the apparatus used therefor is not limited. A common vacuum dryer or hot air dryer may be used. A revolver-type heating apparatus or a heating apparatus equipped with a stirring blade, a fluidized bed dryer or the like may also be used. From the viewpoint of efficiently and uniformly carrying out the heat treatment of the PAS, a revolver-type heating apparatus or a heating apparatus equipped with a stirring blade is preferably used for the heat treatment. Regarding the atmosphere during the additional heat treatment of the PAS obtained after carrying out Step 4, the heat treatment is preferably carried out in a non-oxidizing atmosphere from the viewpoint of preventing degradation or oxidation of end groups. In some instances, this heat treatment is carried out for increasing the melt viscosity of the PAS. In such instances, the heat treatment may be carried out in an atmosphere containing a certain amount of oxygen. Regarding the lower limit, the oxygen concentration in such instances may be, for example, not less than 0.5% by volume, preferably not less than 1% by volume. On the other hand, regarding the upper limit, the oxygen concentration may be, for example, preferably not more than 50% by volume, more preferably not more than 25% by volume, still more preferably not more than 15% by volume. When the oxygen concentration in the atmosphere during the heat treatment of the PAS is within the preferred range described above, there is a tendency that the PAS is not excessively heat-denatured, and that the melt viscosity of the PAS can be easily controlled to a desired viscosity. For the gas flow during the additional heat treatment of the PAS obtained after carrying out Step 4, a certain level of flow rate is preferably employed from the viewpoint of efficiently allowing the heat treatment to proceed. Regarding the lower limit, the flow rate may be, for example, not less than 0.1 L/minute per 1 kg of the resin. On the other hand, regarding the upper limit, the flow rate per 1 kg of the resin may be, for example, not more than 50 L/minute, preferably not more than 30 L/minute, more preferably not more than 15 L/minute. When the flow rate of the gas flow during the heat treatment of the PAS is within the preferred range described above, there is a tendency that the PAS can be efficiently heat-treated.

(9) Properties of PAS

In the PAS obtained by our method, oligomer components having relatively low volatility (high boiling points) that are adhered and deposited on the mold during molding are reduced. Therefore, the PAS is characteristic in that less mold deposits are generated during its molding. Because of this, the frequency of maintenance of the mold used for the molding of the PAS can be reduced, and therefore improvement of the productivity in the molding of the PAS can be expected. Also, when the PAS obtained by our method is used at high temperature, for example, in instances of its use in an automobile lamp reflector or a projector, or a related part thereof, the PAS does not cause the problem of fogging of lens parts that are present around such parts. Thus, the PAS can be preferably used for such uses. Evaluation of the mold deposits of the PAS is carried out as follows. First, extrusion molding (cylinder temperature, 320° C.; charge, 60 parts by weight of PAS and 40 parts by weight of chopped glass fibers (T-760H, manufactured by Nippon Electric Glass Co., Ltd.)) is carried out to prepare pellets, and the obtained pellets are charged into an injection molding machine (SE-30D) manufactured by Sumitomo Heavy Industries, Ltd. at a cylinder temperature of 325° C. A mold for evaluating the amount of gas (mold size: 55 mm (maximum length)×20 mm (width)×2 mm (thickness); gate size: 2 mm (width)×1 mm (thickness) (side gate); gas vent section: 20 mm (maximum length)×10 mm (width)×5 μm (depth)) heated at 130° C. is then placed to carry out continuous molding of 1,000 shots. Thereafter, the substance adhering to the gas vent section is collected and weighed to perform the evaluation.

In the PAS obtained by our method, oligomer components having relatively high volatility that are not adhered or deposited on the mold during molding are also reduced so that the amount of gas generated during the heating also tends to be small. More specifically, the amount of gas collected during heating of the PAS at 320° C. for 2 hours tends to be 0.10% by weight to 0.75% by weight relative to the weight of the charged PAS. Since the gas generated during heating of the PAS is a causative substance of odor, it is preferred to reduce the amount of the gas from the PAS obtained by our method to within the range described above also from the viewpoint of obtaining an effect that improves the work environment during molding of the PAS. The measurement of gas generation from the PAS in our method is carried out as follows. First, 3 g of the PAS is placed in a glass ampule (body part, 100 mm×25 mm (diameter); neck part, 255 mm×12 mm (diameter); thickness, 1 mm), and the glass ampule is vacuumed and sealed. Subsequently, the body part of this ampule is inserted into a ceramic electric tube furnace ARF-30K manufactured by Asahi-Rika Co., Ltd., and then heated at 320° C. for 2 hours in the state where the neck part of the ampule protrudes to the outside of the tube furnace. Thereafter, the ampule is removed, and the neck part of the ampule, to which the gas component is adhering, is cut using a file, followed by measuring its weight. The cut neck part is washed with chloroform, and then dried, followed by measuring its weight again. The difference between the weights of the cut neck part before and after the chloroform washing is divided by the weight of the original weight of the PAS, to obtain the value to be evaluated as the amount of gas generated.

We found that, when the PAS obtained by our method is subjected to measurement of the molecular weight by gel permeation chromatography (GPC), which is a type of size exclusion chromatography (SEC), the molecular weight distribution shows a characteristic shape which is not found in conventional PAS's. More specifically, the PAS shows a molecular weight distribution having a shape in which, when the cumulative integral value from the molecular weight of 100 to the molecular weight of 10,000 in the molecular weight distribution curve is taken as 100, the cumulative integrated value at the molecular weight of 4,000 is 48 to 53. For example, in a production method for a PAS by the quench method such as the method described in JP '933, after the PAS is polymerized, an operation of adding water into the system is carried out before the precipitation of PAS particles, followed by slowly cooling the system to allow the PAS particles to grow to have a large particle size. When such a treatment is carried out, porous PAS particles tend to be formed so that oligomer components not corresponding to the causative substances of the mold deposits tend to be excessively removed by washing with an organic solvent. A PAS obtained by that quench method shows a molecular weight distribution having a shape in which, when the cumulative integral value from the molecular weight of 100 to the molecular weight of 10,000 in the molecular weight distribution curve is taken as 100, the cumulative integrated value at the molecular weight of 4,000 is less than 48. Thus, the PAS tends to become a material which shows less mold deposits during molding, but which has low melt fluidity and poor moldability. On the other hand, in a production method for a PAS by the flash method such as the method described in JP '256, the reaction system under high temperature conditions after polymerization of the PAS is flashed into a container at normal pressure or decompression pressure to distill off the polymerization solvent. Since the greatest advantage of that method has been widely recognized as inexpensive production of a PAS, the method does not lead to the idea of performing the washing operation using an organic solvent at an additional cost. The PAS obtained by the flash method shows a molecular weight distribution having a shape in which, when the cumulative integral value from the molecular weight of 100 to the molecular weight of 10,000 in the molecular weight distribution curve is taken as 100, the cumulative integrated value at the molecular weight of 4,000 is more than 53. Thus, the PAS tends to become a material which has high melt fluidity, but which shows more mold deposits during molding. Compared to the conventional PAS's described above, the PAS obtained by our method can be said to be a material which achieves both reduction of mold deposits during molding and high melt fluidity, and therefore to be a material having better moldability. Evaluation of the melt fluidity of our PAS was carried out by measuring the melt flow rate (the resin discharge amount per 10 minutes) according to ASTM-D1238-70, and comparing the value.

In the PAS obtained by our method, when the melt flow rate of the PAS is defined as MFR1, and when the melt flow rate obtained after mixing the PAS with an epoxy silane coupling agent at a weight ratio of 100:1 and heating the resulting mixture at 315.5° C. for 5 minutes is defined as MFR2, the rate of change represented by MFR2/MFR1 is not more than 0.085. This means that reaction of the PAS with the epoxy silane coupling agent causes an increase in the melt viscosity, and that the melt viscosity increases as the rate of change decreases. When the rate of change represented by MFR2/MFR1 exceeds 0.085, there is a problem that a compound prepared by melt kneading with another resin or inorganic filler has poor hydrolysis resistance. To obtain such a PAS, in Step 4, the PAS needs to be heated under a flow of an inert gas at a flow rate of not less than 0.2 L/minute per 1 kg of the PAS, to distill off the organic solvent used in Step 3. Thus, a PAS whose melt viscosity largely increases due to reaction with an epoxy silane coupling agent tends to have improved hydrolysis resistance when it is prepared as a compound by melt kneading with another resin or inorganic filler, and such a PAS can therefore be preferably used in uses requiring hydrolysis resistance. The lower limit of the rate of change represented by MFR2/MFR1 is not limited. The rate of change may be, for example, not less than 0.0001, preferably not less than 0.001, more preferably not less than 0.002. Regarding the upper limit, the rate of change is not more than 0.085 as described above, and may be, for example, preferably not more than 0.070, more preferably not more than 0.060. When the rate of change represented by MFR2/MFR1 is within the preferred range described above, the PAS tends to have improved hydrolysis resistance when it is prepared as a compound by melt kneading with another resin or inorganic filler, and such a PAS can therefore be especially preferably used in uses requiring hydrolysis resistance. The rate of change represented by MFR2/MFR1 is calculated as follows. First, the melt flow rate of the PAS is measured according to ASTM-D1238-70 to determine MFR1, and then a mixture prepared by mixing 1 g of the PAS with 0.01 g of 2-(3,4-epoxycyclohexyl)ethyltrimethoxysilane (KBM-303, manufactured by Shin-Etsu Chemical Co., Ltd.) using a mortar and a pestle is subjected to measurement of the melt flow rate to determine MFR2, followed by calculation of MFR2/MFR1.

Preferably, the PAS obtained by our method has a particulate shape, and the PAS particle has a median diameter D50 of 1 μm to 400 μm. To achieve such a particle size, the polymerization may be carried out by the flash method. In this example, particles are instantly generated, and crystal growth does not sufficiently proceed. Thus, the median diameter D50 can be easily controlled to within the preferred range described above. After the particles are subjected to Step 1 (flash), the median diameter D50 slightly changes due to clumping, fusion, and/or the like during the process of Steps 2, 3, and 4 before the final median diameter D50 is achieved. Our PAS has a smaller particle size than that of a PAS produced by the conventional quench method. Such a PAS tends to show more rapid melting and uniformization during melt kneading with another resin or inorganic filler.

The median diameter D50 of our PAS is measured using a laser particle size distribution meter together with N-methyl-2-pyrrolidone as a dispersion solvent.

Our PAS tends to have a cooling crystallization temperature of 210° C. to 250° C. Compared to common PAS's, the PAS obtained by our method tends to have higher crystallinity. The PAS can therefore be especially preferably used for injection molding of resins. It is known that, in injection molding, crystallization is generally more promoted as the cooling speed decreases in the cooling crystallization temperature range during the process from the molten state to the cooled and solidified state. Therefore, for resins having low crystallinity, the mold temperature is often set to a relatively high temperature to suppress the cooling speed. However, since the PAS obtained by our method tends to have high crystallinity, crystallization sufficiently proceeds even at a relatively low mold temperature, to enable efficient molding of the PAS. The cooling crystallization temperature of the PAS obtained by our preferred method varies depending on the polymerization conditions and the washing conditions. Regarding the lower limit, the cooling crystallization temperature is likely to be not less than 210° C., more likely to be not less than 220° C. Regarding the upper limit, the cooling crystallization temperature is likely to be not more than 250° C., more likely to be not more than 240° C.

Further, the PAS obtained by our method tends to have high crystallinity in the state of powdery granules that have not been subjected to molding. Therefore, the PAS can be preferably used for, for example, fillers, adsorbents, and paints, in which PAS is used in the state of powdery granules. As a post-processing method of increasing the crystallinity of a PAS, a method in which an annealing process is carried out at a temperature slightly higher than the glass-transition temperature is commonly known. In Step 3, there is a tendency that the washing of the PAS with the organic solvent allows the solvent to permeate into the PAS particles to promote solvent crystallization, thereby increasing the crystallinity. Thus, even when the annealing process is not carried out, our PAS has high crystallinity, and therefore can be preferably used as a powdered granular resin material having excellent heat resistance, chemical resistance, and mechanical properties.

Further, our PAS can be widely used not only for injection molding of resins, but also for extrusion molding of resins, and as molded products of fibers, sheets, films, and pipes. Also during molding into shapes of fibers, sheets, films, and pipes, our PAS is effective for reduction of deposits on the metal cap or molding die.

Our PAS may be used alone. When desired, an inorganic filler such as a glass fiber, carbon fiber, titanium oxide, or calcium carbonate; an antioxidant; a heat stabilizer; a UV absorber; a colorant; and/or the like may be added to the PAS. The PAS may also be used as a mixture with another resin such as polyamide; polysulfone; polyphenylene; polycarbonate; polyether sulfone; polyethylene terephthalate; polybutylene terephthalate; polyethylene; polypropylene; polytetrafluoroethylene; an olefin copolymer containing a functional group such as an epoxy group, a carboxyl group, a carboxylate ester group, or an acid anhydride group; a polyolefin-based elastomer; a polyether ester elastomer; a polyether amide elastomer; polyamide-imide; polyacetal; or polyimide. By the inclusion of these materials, physical properties of the material such as heat resistance and mechanical strength tend to be improved.

EXAMPLES

Our PAS's and methods will be described below concretely by way of Examples. These Examples are examples, not a limitation.

Measurement of Amount of Dihalogenated Aromatic Compound

Measurement of the amount of a dihalogenated aromatic compound (for example, quantification of p-dichlorobenzene) in the reaction solution was carried out using gas chromatography (GC) under the following conditions.

Apparatus: GC-2010, manufactured by Shimadzu Corporation

Column: DB-5 0.32 mm×30 m (0.25 μm), manufactured by J&W Scientific

Carrier Gas: Helium

Detector: Hydrogen flame ionization detector (FID)

Measurement of Specific Surface Area

For measurement of the specific surface area ($m^2/g$) of the PAS, 0.2 g of the PAS was placed in a glass cell, and then decompression degassing was carried out at room temperature for 5 hours, followed by performing the krypton gas adsorption method under the following conditions.

Apparatus: BELSORP-max, manufactured by Bel Japan, Inc.

Adsorbent: Kr

Measurement temperature: 77 k (liquid nitrogen temperature)

Measurement mode: Isothermal adsorption process

Analysis method: Multipoint BET theories

Measurement of Water Content

The water content (% by weight) of the PAS was measured by the Karl Fischer method according to Japanese Industrial Standards JIS K 7251.

Measurement of Molecular Weight, and Evaluation Method for Molecular Weight Distribution Shape Measurement of the molecular weight of the PAS was carried out by gel permeation chromatography (GPC), which is a type of size exclusion chromatography (SEC). A measurement sample was prepared as follows. To 5 mg of PAS, 5 g of 1-chloronaphthalene was added. After dissolving the PAS by heating at 250° C., the resulting solution was cooled to room temperature to form a slurry, followed by filtering the slurry through a membrane filter (hole diameter, 0.1 μm). The prepared sample was subjected to GPC measurement under the following conditions, and the number average molecular weight (Mn) and the weight average molecular weight (Mw) were calculated in terms of polystyrene.

Apparatus: SSC-7110, manufactured by Senshu Scientific Co., Ltd.

Column: Shodex UT806M×2

Eluent: 1-Chloronaphthalene

Detector: Differential Refractometer

Column temperature: 210° C.

Pre-constant bath temperature: 250° C.

Pump constant bath temperature: 50° C.

Detector temperature: 210° C.

Flow rate: 1.0 mL/minute

Sample injection amount: 300 μL

The molecular weight distribution shape of the PAS was evaluated as follows. First, the concentration fractions of the chromatogram obtained by the above GPC measurement were sequentially accumulated, and an integral molecular weight distribution curve was prepared by plotting the molecular weight (log) on the horizontal axis and plotting the integrated value of the concentration fraction on the vertical axis. The range corresponding to the molecular weight values of 100 to 10,000 on the horizontal axis of the integral molecular weight distribution curve was extracted, and the cumulative integral value of the molecular weights of 100 to 4,000 was calculated taking the cumulative integral value of the molecular weights of 100 to 10,000 as 100. The resulting value was regarded as the molecular weight distribution shape.

Measurement of Amount of Chloroform-Extractable Components

The amount of chloroform-extractable components in the PAS was calculated as follows. After weighing 10 g of PAS, the PAS was subjected to soxhlet extraction with 100 g of chloroform for 3 hours. Chloroform was distilled away from the resulting extract, and the obtained component was weighed, followed by calculating its ratio to the weight of the charged polymer, to determine the amount of chloroform-extractable components (% by weight).

Step 4 is a step of distilling off the organic solvent used in Step 3, by heating under a flow of an inert gas. When Step 4 is carried out under preferred conditions, the amount of chloroform-extractable components in the PAS hardly changes due to Step 4. Therefore, the amount of chloroform-extractable components in the PAS after carrying out Step 3 was evaluated based on the amount of chloroform-extractable components in the PAS after carrying out Step 4.

Measurement of Gas Generation

Measurement of gas generation from the PAS was carried out as follows. First, 3 g of the PAS was placed in a glass ampule (body part, 100 mm×25 mm (diameter); neck part, 255 mm×12 mm (diameter); thickness, 1 mm), and the glass ampule was vacuumed and sealed. Subsequently, the body part of this ampule was inserted into a ceramic electric tube furnace ARF-30K manufactured by Asahi-Rika Co., Ltd., and then heated at 320° C. for 2 hours in the state where the neck part of the ampule protruded to the outside of the tube furnace. Thereafter, the ampule was removed, and the neck part of the ampule, to which the gas component was adhering, was cut using a file, followed by measuring its weight. The cut neck part was then washed with chloroform, and then dried, followed by measuring its weight again. The difference between the weights of the cut neck part before and after the chloroform washing was divided by the original weight of the PAS, to obtain the value to be evaluated as the amount of gas generated (% by weight).

Evaluation of Mold Deposits

Evaluation of the mold deposits of the PAS was carried out as follows. First, extrusion molding (cylinder temperature, 320° C.; charge, 60 parts by weight of PAS and 40 parts by weight of chopped glass fibers (T-760H, manufactured by Nippon Electric Glass Co., Ltd.) was carried out to prepare pellets, and the obtained pellets were charged into an injection molding machine manufactured by Sumitomo Heavy Industries, Ltd. (SE-30D) at a cylinder temperature of 325°

C. A mold for evaluating the amount of gas (mold size: 55 mm (maximum length)×20 mm (width)×2 mm (thickness); gate size: 2 mm (width)×1 mm (thickness) (side gate); gas vent section: 20 mm (maximum length)×10 mm (width)×5 μm (depth)) heated at 130° C. was then placed to carry out continuous molding of 1,000 shots. Thereafter, the substance adhering to the gas vent section was collected and weighed to perform the evaluation (mg/1,000 shots).

Evaluation of Melt Fluidity

Evaluation of the melt fluidity of the PAS was carried out by measuring the melt flow rate (the resin discharge amount per 10 minutes: g/10 min) according to ASTM-D1238-70, and comparing the value.

Apparatus: Melt Indexer, manufactured by Toyo Seiki Seisaku-sho, Ltd. (using an orifice having a length of 8.0 mm and a hole diameter of 2.095 mm)

Load: 5,000 g

Sample amount: 7 g

Temperature: 315.5° C. (melting time, 5 minutes)

Evaluation of Hydrolysis Resistance

Evaluation of the hydrolysis resistance of the PAS was carried out as follows. First, pellets were prepared by carrying out extrusion molding (cylinder temperature, 320° C.; charge, 60 parts by weight of PAS and 40 parts by weight of chopped glass fibers (T-760H, manufactured by Nippon Electric Glass Co., Ltd.); epoxy silane coupling agent 2-(3,4-epoxycyclohexyl)ethyltrimethoxysilane (KBM-303), manufactured by Shin-Etsu Chemical Co., Ltd.). Subsequently, injection molding was carried out according to the ASTM standard (D-638) using the obtained pellets, and the tensile strength of the obtained test piece was measured. Subsequently, the test piece was immersed in a liquid composed of 54% water, 45% ethylene glycol, 0.5% dipotassium phosphate, and 0.5% diethylene glycol at 150° C. for 168 hours, and the test piece after the 168 hours of immersion was subjected to measurement of the tensile strength, to calculate the strength retention rate of the tensile strength. This strength retention rate was used for the evaluation of the hydrolysis resistance of the PAS.

Rate of Change Represented by MFR2/MFR1

The rate of change represented by MFR2/MFR1, wherein the melt flow rate of the PAS is represented as MFR1, and wherein the melt flow rate obtained after mixing the PAS with an epoxy silane coupling agent at a weight ratio of 100:1 and heating the resulting mixture at 315.5° C. for 5 minutes is represented as MFR2, was determined as follows. First, the melt flow rate of the PAS was measured according to ASTM-D1238-70 to determine MFR1, and then a mixture prepared by mixing 1 g of the PAS with 0.01 g of 2-(3,4-epoxycyclohexyl)ethyltrimethoxysilane (KBM-303, manufactured by Shin-Etsu Chemical Co., Ltd.) using a mortar and a pestle was subjected to measurement of the melt flow rate by heating at 315.5° C. for 5 minutes to determine MFR2, followed by calculation of MFR2/MFR1.

Measurement of Median Diameter D50

Measurement of the median diameter D50 (μm) of the PAS in the particulate shape obtained by our method was carried out under wet conditions using the following apparatus together with N-methyl-2-pyrrolidone as a dispersion solvent.

Apparatus: Laser particle size distribution meter SALD-2000, manufactured by Shimadzu Corporation Measurement of Cooling Crystallization Temperature Tmc Measurement of the cooling crystallization temperature Tmc (° C.) of the PAS was carried out using a differential scanning calorimeter under the following conditions.

Apparatus: Q20, manufactured by TA Instruments Inc.

Measurement atmosphere: Under a nitrogen gas flow

Sample charge weight: About 10 mg

Measurement Conditions:

(a) Retention at 50° C. for 1 minute (b) Raising of the temperature from 50° C. to 340° C. at a rate of 20° C./minute (c) Retention at 340° C. for 1 minute (d) Cooling from 340° C. to 100° C. at a rate of 20° C./minute (e) Retention at 100° C. for 1 minute (f) Raising of the temperature from 100° C. to 340° C. at a rate of 20° C./minute

Example 1

To an autoclave equipped with a mixer and with an extraction valve at the bottom, a distillation equipment and an alkaline trap were connected, and 11.6 kg (100 moles) of 48.3% aqueous sodium hydrosulfide solution, 8.25 kg (101 moles) of 48.9% aqueous sodium hydroxide solution, 16.4 kg (165 moles) of N-methyl-2-pyrrolidone, and 1.56 kg (19.0 moles) of acetic acid were charged therein, followed by sufficient nitrogen substitution of the inside of the reaction container.

While nitrogen was allowed to flow into the autoclave, the mixture was slowly heated to 237° C. for 3 hours with stirring at 60 rpm. As a result of deliquefaction, 12 kg of a distillate was obtained. As a result of analysis of the distillate by gas chromatography, the composition of the distillate was found to be 10.2 kg of water and 1.8 kg of N-methyl-2-pyrrolidone. We thus found that, at this stage, 20 g (1 mole) of water was remaining, and 14.6 kg of N-methyl-2-pyrrolidone was remaining, in the reaction system. The amount of hydrogen sulfide that has flown away from the reaction system through the dehydration operation was 0.675 moles.

Subsequently, the autoclave was cooled to not more than 170° C., and 15 kg (101.8 moles) of p-dichlorobenzene and 14.6 kg (147 moles) of N-methyl-2-pyrrolidone were charged therein, followed by performing sufficient nitrogen substitution of the inside of the reaction container again, and then sealing the container. By this, the amount of the dihalogenated aromatic compound used in the mixture became 102.5 moles per 1 mole of sulfur in the sulfidating agent. As a result of the charging operation, the internal temperature decreased to 130° C.

Subsequently, the temperature in the reaction container was raised from 130° C. to 275° C. with stirring at 250 rpm for about 2 hours, and then kept at 275° C. for 70 minutes to allow the reaction to proceed. The pressure in the system was 1.10 MPa.

Step 1

After the end of the reaction, the extraction valve at the bottom of the autoclave was opened up, and the reaction solution at 1.10 MPa at 275° C. was flashed for 15 minutes into a container equipped with a mixer (having a distillation equipment) heated to 220° C. at normal pressure. Thereafter, the container was kept at 240° C. with stirring to distill off N-methyl-2-pyrrolidone, and then the heating was stopped to cool the container. The solid content in the container was then recovered.

Step 2

The solid content obtained in Step 1 was charged into another container equipped with a mixer, and 108 kg of ion-exchanged water was added thereto, followed by stirring the mixture at 70° C. for 30 minutes and then filtering the mixture through a pressurized filter to obtain a cake.

The cake obtained as described above was charged into a pressure resistant container equipped with a mixer, and 128 kg of ion-exchanged water was added thereto, followed by performing nitrogen substitution, raising the temperature to 192° C., and then stirring the mixture for 30 minutes. Subsequently, the container was cooled, and then a slurry was removed therefrom and subjected to filtration through a pressurized filter to obtain a cake.

The cake obtained as described above was charged again into a container equipped with a mixer, and 108 kg of ion-exchanged water was added thereto, followed by stirring the mixture at 70° C. for 30 minutes and then filtering the mixture through a pressurized filter to obtain a cake. This process was repeated three times.

The cake under the wet condition obtained was dried at 120° C. for 3 hours under a nitrogen gas flow to obtain a dry polyphenylene sulfide (PPS). The water content of the dry PPS obtained was measured by the Karl Fischer method according to the method described in JIS K 7251. As a result, the water content was found to be 0.10% by weight.

Step 3

The dry PPS obtained in Step 2 was charged into a container equipped with a mixer, and 54 kg of N-methyl-2-pyrrolidone (weight bath ratio to PPS, 5) was added thereto, followed by stirring the mixture at 30° C. for 20 minutes and then filtering the mixture through a pressurized filter to obtain a cake.

Step 4

The cake under the wet condition obtained in Step 3 (containing 10.8 kg of PPS) was heated at 200° C. for 20 hours under a nitrogen flow at a flow rate of 4 L/minute (0.4 L/minute per 1 kg of polyarylene sulfide) to distill off NMP, to thereby obtain a dry PPS.

In Step 3, the specific surface area of the PPS before the washing with the organic solvent was measured. As a result, the specific surface area was found to be 11 $m^2/g$. The water content was 0.1% by weight. Further, reaction for generating PPS was carried out in the same manner as in Example 1, and, before carrying out Step 1, the reaction solution was cooled and removed, and then subjected to analysis of the DCB conversion rate. As a result, the conversion rate was found to be 98.6%.

As a result of analysis of the PPS obtained in Example 1, the weight average molecular weight Mw was found to be 40,000. When the cumulative integral value from the molecular weight of 100 to the molecular weight of 10,000 was taken as 100, the cumulative integrated value from the molecular weight of 100 to the molecular weight of 4,000 was calculated to be 52. Since the amount of chloroform-extractable components in the PPS after carrying out Step 4 was 0.8% by weight, the amount of chloroform-extractable components in the PPS after carrying out Step 3 can also be thought to be 0.8% by weight. The median diameter D50 was 300 μm; the amount of gas generated was 0.67% by weight; the cooling crystallization temperature Tmc was 222° C.; MFR1 was 637 g/10 minutes; MFR2 was 32 g/10 minutes; and the rate of change represented by MFR2/MFR1 was 0.050.

As a result of performing injection molding using the PPS obtained in Example 1, the melt fluidity was found to be high, and no poor appearance was found in the molded product. The amount of mold deposits adhering after 1,000 shots of molding was as small as 0.5 mg. According to evaluation of hydrolysis resistance of the obtained compound, the tensile strength before the test was 194 MPa, and the tensile strength after the test was 170 MPa so that the strength retention rate was 88%. Thus, a compound having high hydrolysis resistance was obtained.

Example 2

A PPS was produced in the same manner as in Example 1 except that the temperature for distilling off the organic polar solvent in Step 1 was 250° C. In Step 3, the specific surface area of the PPS before the washing with the organic solvent was found to be 4.5 $m^2/g$. The water content was 0.10% by weight.

As a result of analysis of the PPS obtained in Example 2, the weight average molecular weight Mw was found to be 40,000. When the cumulative integral value from the molecular weight of 100 to the molecular weight of 10,000 was taken as 100, the cumulative integrated value from the molecular weight of 100 to the molecular weight of 4,000 was calculated to be 51. Since the amount of chloroform-extractable components in the PPS after carrying out Step 4 was 1.6% by weight, the amount of chloroform-extractable components in the PPS after carrying out Step 3 can also be thought to be 1.6% by weight. The median diameter D50 was 320 μm; MFR1 was 640 g/10 minutes; MFR2 was 32 g/10 minutes; and the rate of change represented by MFR2/MFR1 was 0.050.

As a result of performing injection molding using the PPS obtained in Example 2, the melt fluidity was found to be high, and no poor appearance was found in the molded product. The amount of mold deposits adhering after 1,000 shots of molding was as small as 0.7 mg. According to evaluation of hydrolysis resistance of the obtained compound, the tensile strength before the test was 190 MPa, and the tensile strength after the test was 166 MPa so that the strength retention rate was 87%. Thus, a compound having high hydrolysis resistance was obtained.

Example 3

A PPS was produced in the same manner as in Example 1 except that the organic solvent used in Step 3 was toluene.

As a result of analysis of the PPS obtained in Example 3, the weight average molecular weight Mw was found to be 40,000. When the cumulative integral value from the molecular weight of 100 to the molecular weight of 10,000 was taken as 100, the cumulative integrated value from the molecular weight of 100 to the molecular weight of 4,000 was calculated to be 51. Since the amount of chloroform-extractable components in the PPS after carrying out Step 4 was 0.9% by weight, the amount of chloroform-extractable components in the PPS after carrying out Step 3 can also be thought to be 0.9% by weight. The median diameter D50 was 300 μm.

As a result of performing injection molding using the PPS obtained in Example 3, the melt fluidity was found to be high, and no poor appearance was found in the molded product. The amount of mold deposits adhering after 1,000 shots of molding was as small as 0.6 mg.

Example 4

A PPS was produced in the same manner as in Example 3 except that the cake under the wet condition obtained by carrying out Step 2 was not dried, and hence the water content in the PPS before the washing with the organic solvent in Step 3 was 45% by weight.

As a result of analysis of the PPS obtained in Example 4, the weight average molecular weight Mw was found to be 40,000. When the cumulative integral value from the molecular weight of 100 to the molecular weight of 10,000 was taken as 100, the cumulative integrated value from the molecular weight of 100 to the molecular weight of 4,000 was calculated to be 51. Since the amount of chloroform-extractable components in the PPS after carrying out Step 4 was 0.9% by weight, the amount of chloroform-extractable components in the PPS after carrying out Step 3 can also be thought to be 0.9% by weight. The median diameter D50 was 300 μm.

As a result of performing injection molding using the PPS obtained in Example 4, the melt fluidity was found to be high, and no poor appearance was found in the molded product. The amount of mold deposits adhering after 1,000 shots of molding was as small as 0.6 mg.

As described above, Example 4 used toluene as the washing solvent, and was carried out in the same manner as Example 3 except that the water content in the PPS before the washing with the organic solvent in Step 3 was 45% by weight. As a result, the PPS obtained had almost the same quality.

Comparative Example 1

A PPS was produced in the same manner as in Example 1 except that Step 3 was not carried out. As a result, the weight average molecular weight Mw of the obtained PPS was 39,000. When the cumulative integral value from the molecular weight of 100 to the molecular weight of 10,000 was taken as 100, the cumulative integrated value from the molecular weight of 100 to the molecular weight of 4,000 was calculated to be 54. Since the amount of chloroform-extractable components in the PPS after carrying out Step 4 was 2.9% by weight, the amount of chloroform-extractable components in the PPS after carrying out Step 3 can also be thought to be 2.9% by weight. The median diameter D50 was 300 μm; the amount of gas generated was 0.81% by weight; the cooling crystallization temperature Tmc was 200° C.; MFR1 was 657 g/10 minutes; MFR2 was 41 g/10 minutes; and the rate of change represented by MFR2/MFR1 was 0.062.

As a result of performing injection molding using the PPS obtained in Comparative Example 1, the amount of mold deposits adhering after 1,000 shots of molding was as large as 1.5 mg. On the other hand, according to evaluation of hydrolysis resistance of the obtained compound, the tensile strength before the test was 192 MPa, and the tensile strength after the test was 162 MPa so that the strength retention rate was 84%. Thus, the compound had high hydrolysis resistance.

Comparative Example 2

A PPS was produced by omitting Step 1 after the end of the reaction, repeating Step 3 of Example 1 three times, and then carrying out Step 2 of Example 1. As a result, the weight average molecular weight Mw of the obtained PPS was 42,000. When the cumulative integral value from the molecular weight of 100 to the molecular weight of 10,000 was taken as 100, the cumulative integrated value from the molecular weight of 100 to the molecular weight of 4,000 was calculated to be 42. Since the amount of chloroform-extractable components in the PPS after carrying out Step 4 was 0.5% by weight, the amount of chloroform-extractable components in the PPS after carrying out Step 3 can also be thought to be 0.5% by weight. The median diameter D50 was 450 μm; the cooling crystallization temperature Tmc was 205° C.; MFR1 was 580 g/10 minutes; MFR2 was 72 g/10 minutes; and the rate of change represented by MFR2/MFR1 was 0.124.

As a result of performing injection molding using the PPS obtained in Comparative Example 2, the amount of mold deposits adhering after 1,000 shots of molding was as small as 0.4 mg. However, the melt fluidity was low, and a small number of molded products showed poor appearance. According to evaluation of hydrolysis resistance of the obtained compound, the tensile strength before the test was 185 MPa, and the tensile strength after the test was 102 MPa so that the strength retention rate was 55%. Thus, the compound had low hydrolysis resistance. Further, the filtrate obtained after the washing contained water, water-soluble substances, and the organic polar solvent, and recovery of the organic polar solvent was difficult. Thus, it is difficult for the method of Comparative Example 2 to produce a PPS at low cost.

Comparative Example 3

A PPS was produced in the same manner as in Example 1 except that the flow rate of the nitrogen flow was 1 L/minute (0.1 L/minute per 1 kg of polyarylene sulfide) in Step 4.

As a result of analysis of the PPS obtained in Comparative Example 3, the weight average molecular weight Mw was found to be 40,000. When the cumulative integral value from the molecular weight of 100 to the molecular weight of 10,000 was taken as 100, the cumulative integrated value from the molecular weight of 100 to the molecular weight of 4,000 was calculated to be 52. Since the amount of chloroform-extractable components in the PPS after carrying out Step 4 was 0.8% by weight, the amount of chloroform-extractable components in the PPS after carrying out Step 3 can also be thought to be 0.8% by weight. The median diameter D50 was 300 μm; MFR1 was 630 g/10 minutes; MFR2 was 57 g/10 minutes; and the rate of change represented by MFR2/MFR1 was 0.090. As a result of performing injection molding using the PPS obtained in Comparative Example 3, the melt fluidity was found to be high, and no poor appearance was found in the molded product. The amount of mold deposits adhering after 1,000 shots of molding was as small as 0.5 mg. However, according to evaluation of hydrolysis resistance of the obtained compound, the tensile strength before the test was 194 MPa, and the tensile strength after the test was 131 MPa so that the strength retention rate was 68%. Thus, the compound had low hydrolysis resistance.

TABLE 1

| | Units | Example 1 | Example 2 | Example 3 | Example 4 | Comparative Example 1 | Comparative Example 2 | Comparative Example 3 |
|---|---|---|---|---|---|---|---|---|
| Distilling Temperature for Solvent in Step 1 | ° C. | 220 | 250 | 220 | 220 | 220 | No Distillation | 220 |
| Organic Solvent for Washing in Step 3 | — | NMP | NMP | Toluene | Toluene | None | NMP | NMP |

TABLE 1-continued

| | Units | Example 1 | Example 2 | Example 3 | Example 4 | Comparative Example 1 | Comparative Example 2 | Comparative Example 3 |
|---|---|---|---|---|---|---|---|---|
| Water Content in PAS before Washing in Step 3 | wt % | 0.1 | 0.1 | 0.1 | 45 | 0.1 | 0.1 | 0.1 |
| Specific Surface Area of PAS before Washing in Step 3 | $m^2/g$ | 11 | 4.5 | — | — | 11 | 22 | — |
| Flow Rate of Inert Gas flowing in Step 4 | L/min | 0.4 | 0.4 | 0.4 | 0.4 | 0.4 | 0.4 | 0.1 |
| Amount of Chloroform-Extractable Components in PAS | wt % | 0.8 | 1.6 | 0.9 | 0.9 | 2.9 | 0.5 | 0.8 |
| Weight Average Molecular Weight Mw | — | 40,000 | 40,000 | 40,000 | 40,000 | 39,000 | 42,000 | 40,000 |
| Cumulative Integral Value of Molecular Weight from 100 to 4,000 calculated with taking the Cumulative Integral Value of Molecular Weight from 100 to 10,000 as 100, in Molecular Weight Distribution Curve (Molecular Weight Distribution Shape) | — | 52 | 51 | 51 | 51 | 54 | 42 | 52 |
| Rate of Change represented by MFR2/MFR1 | | 0.050 | 0.050 | — | — | 0.062 | 0.124 | 0.090 |
| Median Diameter D50 | μm | 300 | 320 | 300 | 300 | 300 | 450 | 300 |
| Gas Generation Amount | wt % | 0.67 | — | — | — | 0.81 | — | — |
| Cooling Crystallization Temperature Tmc | ° C. | 222 | — | — | — | 200 | 205 | — |
| Mold Deposits | mg/1,000 shot | 0.5 | 0.7 | 0.6 | 0.6 | 1.5 | 0.4 | 0.5 |
| MFR1 (Melt Fluidity) | g/10 min | 637 | 640 | — | — | 657 | 580 | 630 |
| Tensile Strength | MPa | 194 | 190 | — | — | 192 | 185 | 194 |
| Tensile Strength after Immersion Test in Specific Liquid for 168 hr | MPa | 170 | 166 | — | — | 162 | 102 | 131 |
| Hydrolysis Resistance (Tensile Strength Retention after Immersion in Specific Liquid) | % | 88 | 87 | — | — | 84 | 55 | 68 |
| Manufacturing Cost | — | ○ | ○ | — | — | ○ | x | ○ |

The invention claimed is:

1. A method of producing a polyarylene sulfide comprising reacting a mixture containing at least a sulfidating agent, a dihalogenated aromatic compound, and an organic polar solvent under heat, wherein, after the end of the reaction that generates the polyarylene sulfide, Steps 1, 2, 3 and 4 are carried out:

Step 1: a step in which the organic polar solvent is distilled off from the reaction mixture obtained at the end of the reaction, to obtain a solid content containing the polyarylene sulfide;

Step 2: a step which follows Step 1, wherein the solid content containing the polyarylene sulfide is washed with water;

Step 3: a step which follows Step 2, wherein the polyarylene sulfide is washed with an organic solvent such that the amount of chloroform-extractable components in the polyarylene sulfide becomes not more than 1.7% by weight; and Step 4: a step which follows Step 3, wherein the polyarylene sulfide is heated under a flow of an inert gas at a flow rate of not less than 0.2 L/minute per 1 kg of the polyarylene sulfide, to distill off the organic solvent used in Step 3, wherein the organic solvent has a distillation temperature of 70° C. to 250° C., wherein a dry polyarene sulfide is obtained by the end of Step 4.

2. The method according to claim 1, wherein in Step 1, the distillation temperature for the organic polar solvent is 200° C. to 250° C.

3. The method according to claim 1, wherein in Step 3, the water content in the polyarylene sulfide before the washing with the organic solvent is not more than 30% by weight.

4. The method according to claim 1, wherein in Step 3, the specific surface area of the polyarylene sulfide before the washing with the organic solvent is 5 $m^2/g$ to 50 $m^2/g$.

5. The method according to claim 1, wherein in Step 4, the distillation time for the organic solvent is 0.1 hours to 50 hours.

6. A polyarylene sulfide in which when the cumulative integral value from the molecular weight of 100 to the molecular weight of 10,000 in a molecular weight distribution curve is 100, the cumulative integrated value at the molecular weight of 4000 is 48 to 53, and when the melt flow rate of the polyarylene sulfide is defined as MFR1, and when the melt flow rate obtained after mixing the polyarylene sulfide with an epoxy silane coupling agent at a weight ratio of 100:1 and heating the resulting mixture at 315.5° C. for 5 minutes is defined as MFR2, the rate of change represented by MFR2/MFR1 is not more than 0.085.

7. The polyarylene sulfide according to claim 6, having a particulate shape, and particles of the polyarylene sulfide have a median diameter D50 of 1 μm to 400 μm.

* * * * *